United States Patent
Mestres et al.

(10) Patent No.: US 11,562,013 B2
(45) Date of Patent: Jan. 24, 2023

(54) SYSTEMS AND METHODS FOR IMPROVEMENTS TO USER EXPERIENCE TESTING

(71) Applicant: USERZOOM TECHNOLOGIES, INC., Dover, DE (US)

(72) Inventors: Xavier Mestres, Barcelona (ES); Alfonso de la Nuez, San Jose, CA (US); Albert Recolons, Barcelona (ES); Francesc del Castillo, Barcelona (ES); Jordi Ibañez, Barcelona (ES); Anna Barba, Barcelona (ES); Andrew Jensen, San Jose, CA (US)

(73) Assignee: USERZOOM TECHNOLOGIES, INC., Dover, DE (US)

( * ) Notice: Subject to any disclaimer, the term of this patent is extended or adjusted under 35 U.S.C. 154(b) by 140 days.

(21) Appl. No.: 16/860,653

(22) Filed: Apr. 28, 2020

(65) Prior Publication Data

US 2020/0327156 A1  Oct. 15, 2020

Related U.S. Application Data

(63) Continuation-in-part of application No. 13/112,792, filed on May 20, 2011, now Pat. No. 10,691,583.
(Continued)

(51) Int. Cl.
*G06Q 10/00* (2012.01)
*G06F 16/432* (2019.01)
(Continued)

(52) U.S. Cl.
CPC .......... *G06F 16/432* (2019.01); *G06F 16/483* (2019.01); *G06N 3/08* (2013.01); *G06Q 30/0203* (2013.01)

(58) Field of Classification Search
None
See application file for complete search history.

(56) References Cited

U.S. PATENT DOCUMENTS

| 4,845,665 A | 7/1989 | Heath et al. |
| 4,924,387 A * | 5/1990 | Jeppesen ................ G06Q 50/18 |
| | | 360/13 |

(Continued)

FOREIGN PATENT DOCUMENTS

| WO | WO 2001024057 | 4/2001 | |
| WO | WO-2008098259 A2 * | 8/2008 | ........... G11B 27/005 |

OTHER PUBLICATIONS

Robert J. Crutcher (CAPAS 2.0: A computer tool for coding transcribed and digitally recorded verbal reports Behavior Research Methods, 2007, 39 (2), 167-174). (Year: 2007).*

(Continued)

*Primary Examiner* — Hafiz A Kassim
(74) *Attorney, Agent, or Firm* — Kang S. Lim

(57) ABSTRACT

Systems and methods for transcription analysis of a recording are provided. The recording includes an audio and screenshot/video portion. The audio portion is transcribed using a machine learned model. Models may be selected by the recording quality and potentially accents or other speech patterns that are present. The transcription is then linked to the video/screen capture chronology, so that automatic scrolling is enabled, clip selection from the transcription, and searching to a video time is possible. There is improvements to user experience question generation, review of study results, and in managing the study participants.

18 Claims, 36 Drawing Sheets

Related U.S. Application Data

(60) Provisional application No. 62/841,165, filed on Apr. 30, 2019, provisional application No. 61/348,431, filed on May 26, 2010.

(51) Int. Cl.
*G06N 3/08* (2006.01)
*G06F 16/483* (2019.01)
*G06Q 30/02* (2012.01)

(56) References Cited

U.S. PATENT DOCUMENTS

| | | | |
|---|---|---|---|
| 5,086,393 A * | 2/1992 | Kerr | G06F 11/3438 714/E11.193 |
| 5,172,281 A * | 12/1992 | Ardis | G09B 5/065 360/72.2 |
| 5,220,658 A * | 6/1993 | Kerr | G06F 11/3438 714/E11.193 |
| 5,392,428 A * | 2/1995 | Robins | G06F 16/38 |
| 5,724,262 A * | 3/1998 | Ghahramani | G06Q 10/06375 434/350 |
| 5,808,908 A * | 9/1998 | Ghahramani | G06Q 10/06375 702/182 |
| 5,832,171 A * | 11/1998 | Heist | G11B 27/10 386/241 |
| 5,850,470 A * | 12/1998 | Kung | G06K 9/6281 382/157 |
| 6,237,138 B1 | 5/2001 | Hameluck | |
| 6,430,357 B1 * | 8/2002 | Orr | G11B 27/11 386/244 |
| 6,526,526 B1 | 2/2003 | Dong | |
| 6,738,082 B1 | 5/2004 | Dong et al. | |
| 6,859,784 B1 * | 2/2005 | van Duyne | G06Q 30/0203 463/17 |
| 6,895,437 B1 | 5/2005 | Cowdrey | |
| 7,222,078 B2 | 5/2007 | Abelow | |
| 7,587,484 B1 | 9/2009 | Smith | |
| 7,617,445 B1 * | 11/2009 | Townsend | G06F 40/169 715/232 |
| 7,941,525 B1 | 5/2011 | Yavilevich | |
| 8,892,543 B1 | 11/2014 | Kapoor | |
| 2001/0049084 A1 | 12/2001 | Mitry | |
| 2002/0143931 A1 | 10/2002 | Smith | |
| 2002/0161578 A1 * | 10/2002 | Saindon | G06F 40/58 704/235 |
| 2002/0178163 A1 | 11/2002 | Mayer | |
| 2002/0194053 A1 | 12/2002 | Barrett | |
| 2002/0196277 A1 | 12/2002 | Bushey | |
| 2003/0046057 A1 | 3/2003 | Okunishi | |
| 2004/0003042 A1 * | 1/2004 | Horvitz | G06Q 10/109 709/204 |
| 2004/0015329 A1 * | 1/2004 | Shayegan | G09B 23/28 702/179 |
| 2004/0015867 A1 | 1/2004 | Macko | |
| 2004/0047589 A1 * | 3/2004 | Kim | G11B 27/007 386/240 |
| 2004/0174496 A1 * | 9/2004 | Ji | G06F 3/013 351/209 |
| 2004/0177002 A1 | 9/2004 | Abelow | |
| 2005/0043958 A1 * | 2/2005 | Koch | G11B 27/10 704/277 |
| 2005/0048449 A1 * | 3/2005 | Marmorstein | G09B 7/00 434/157 |
| 2005/0246299 A1 * | 11/2005 | Scarborough | G06Q 10/10 706/21 |
| 2005/0254775 A1 * | 11/2005 | Hamilton | G09B 7/02 714/E11.193 |
| 2006/0179403 A1 * | 8/2006 | Kirkpatrick | G11B 27/323 715/202 |
| 2006/0184917 A1 | 8/2006 | Troan | |
| 2006/0242154 A1 * | 10/2006 | Rawat | G06F 16/168 |
| 2007/0195159 A1 * | 8/2007 | Packer | H04N 7/147 348/14.12 |
| 2007/0208766 A1 * | 9/2007 | Malik | H04N 7/173 |
| 2007/0209010 A1 | 9/2007 | West | |
| 2008/0033792 A1 * | 2/2008 | Rosner | G06Q 10/063112 705/7.14 |
| 2008/0180391 A1 * | 7/2008 | Auciello | G06F 3/1423 345/156 |
| 2008/0313149 A1 | 12/2008 | Li | |
| 2008/0313617 A1 | 12/2008 | Zhu | |
| 2008/0313633 A1 | 12/2008 | Zhu | |
| 2009/0138292 A1 | 5/2009 | Dusi | |
| 2009/0204573 A1 | 8/2009 | Neuneier | |
| 2009/0281819 A1 | 11/2009 | Garg | |
| 2009/0281852 A1 | 11/2009 | Abhari et al. | |
| 2010/0030792 A1 | 2/2010 | Swinton et al. | |
| 2010/0095208 A1 | 4/2010 | White et al. | |
| 2011/0166884 A1 | 7/2011 | Lesselroth | |
| 2011/0286584 A1 * | 11/2011 | Angel | G10L 15/26 379/88.02 |
| 2011/0314092 A1 | 12/2011 | Lunt et al. | |
| 2012/0016671 A1 * | 1/2012 | Jaggi | G10L 15/22 704/235 |
| 2012/0078660 A1 | 3/2012 | Mangicaro | |
| 2012/0210209 A1 | 8/2012 | Biddle | |
| 2012/0236201 A1 * | 9/2012 | Larsen | H04N 21/439 348/468 |
| 2013/0132833 A1 | 5/2013 | White | |
| 2013/0254735 A1 | 9/2013 | Sakhardande | |
| 2014/0052853 A1 | 2/2014 | Mestres | |
| 2014/0189054 A1 | 7/2014 | Snider et al. | |
| 2017/0278417 A1 | 9/2017 | Ur et al. | |
| 2019/0123989 A1 | 4/2019 | Mestres et al. | |

OTHER PUBLICATIONS

Henry A. Rowley, Shumeet Baluja, and Takeo Kanade (Neural Network-Based Face Detection, IEEE Transactions on Pattern Analysis and Machine Intelligence, vol. 20, No. 1, Jan. 1998). (Year: 1998).*

Marty Carroll (Usability and Web analytics: ROI justification for an Internet strategy, Henry Stewart Publications 1478-0844. Interactive Marketing . vol. 4 No. 3 . pp. 223-234. Jan./Mar. 2003). (Year: 2003).*

ISA/US, "Notification of Transmittal of the ISR and the Written Opinion of the International Searching Authority, or the Declaration," in PCT Application No. PCT/US2020/030558, dated Oct. 9, 2020, 11 pages.

User-Centred Library Websites: Usability Evaluation Methods by Carole George, Edition:2008.

Richard Atterer, Monika Wnuk, and Albrecht Schmidt (Knowing the User's Every Move—User Activity Tracking for Website Usability Evaluation and Implicit Interaction, International World Wide Web Conference Committee, May 23-26, 2006, Edinburgh, Scotland). (Year:2006).

Jason I. Hong, Jeffrey Heer, Sarah Waterson, and James A. Landay (WebQuilt: a Proxy-based Approach to Remote Web Usability Testing, Acm Transactions on Information Systems, vol. 19, No. 3, Jul. 2001, pp. 263-285). (Year: 2001).

* cited by examiner

| VIDEO | TRANSCRIPT |

🔍 Study                                          20  👤

● Hi Lexi! Thanks for taking time participating in this study. My name is Jane, I'll be the moderator and guide you through this study.

Hi Jane. Nice to meet you.

Thanks, so this study will take approximately an hour. We will go through several tasks. Please think out loud while taking the study.

I'll go ahead and start the study for you. You should be able to see a new browser opening. Please let me know if you see it.

——————— STUDY BEGIN ———————

Yeah, I can see the study now.

Can you please share your screen with me? You can do it by clicking the share screen button in the bottom of the conference window.

Sure. Can you see my screen?

Fig. 23

VIDEO      TRANSCRIPT

🔍 Search transcript

▶ Hi Lexi! Thanks for taking time participating in this study. My name is Jane, I'll be the moderator and guide you through this study.

[ Copy Text | Create Clip | Create Mark ]

Thanks, so this study will take approximately an hour. We will go through several tasks. Please think out loud while taking the study.

I'll go ahead and start the study for you. You should be able to see a new browser opening. Please let me know if you see it.

———— STUDY BEGIN ————

Yeah, I can see the study now.

Can you please share your screen with me? You can do it by clicking the share screen button in the bottom of the conference window.

Sure. Can you see my screen?

Fig. 24

PROJECTS CONCURRENCY

◯ One for both, source on your own and IntelliZoom

Source on your own: 1

IntelliZoom: 1

INTELLIZOOM CONFIGURATION

| | Project type | Max segments | Max quota per segment | | Unlimited |
|---|---|---|---|---|---|
| ● | Advanced - Desktop | 5 | 150 | # TCs 30 | ◯ |
| ● | Advanced - Mobile and tablet | 5 | 150 | # TCs 30 | ◯ |
| ● | Advanced - Apps | 5 | 150 | # TCs 30 | ◯ |
| ● | Basic - Desktop | 3 | 30 | # TCs n/a | ● |
| ● | Basic - Mobile and tablet | 3 | 15 | # TCs n/a | ● |
| ● | Basic - Apps | 3 | 15 | # TCs n/a | ● |
| ◯ | Survey | 3 | 150 | # TCs 30 | ◯ |
| ◯ | Live Intercept | 3 | 150 | # TCs 10 | ◯ |
| ◯ | Live Intercept - Apps | 3 | 150 | # TCs 15 | ◯ |
| ◯ | Card Sort | 3 | 150 | # TCs 15 | ◯ |
| ◯ | Tree Test | 3 | 150 | # TCs 15 | ◯ |
| ◯ | Click Test | 3 | 150 | # TCs 15 | ◯ |
| ◯ | Moderated | n/a | n/a | # TCs n/a | ◯ |

Fig. 28

SYSTEMS AND METHODS FOR IMPROVEMENTS TO USER EXPERIENCE TESTING

CROSS REFERENCE TO RELATED APPLICATIONS

This non-provisional application claims priority to U.S. Provisional Application No. 62/841,165, filed on Apr. 30, 2019, of the same title, by inventor Mestres et al., which is incorporated herein by reference.

This application is also a continuation-in-part application and claims priority to U.S. application Ser. No. 13/112,792, filed on May 20, 2011, entitled "System and Method for Unmoderated Remote User Testing and Card Sorting", which application claims priority to U.S. Provisional Application No. 61/348,431, filed on May 26, 2010, of the same title, by inventors Mestres et. al., which are all incorporated herein by reference.

BACKGROUND

The present invention relates to systems and methods for improvements in the generation and results of user's studies that allow for insight generation for the usability of a website. Generally, this type of testing is referred to as "User Experience" or merely "UX" testing.

The Internet provides new opportunities for business entities to reach customers via web sites that promote and describe their products or services. Often, the appeal of a web site and its ease of use may affect a potential buyer's decision to purchase the product/service.

Especially as user experiences continue to improve and competition online becomes increasingly aggressive, the ease of use by a particular retailer's website may have a material impact upon sales performance. Unlike a physical shopping experience, there are minimal hurdles to a user going to a competitor for a similar service or good. Thus, in addition to traditional motivators (e.g., competitive pricing, return policies, brand reputation, etc.) the ease of a website to navigate is of paramount importance to a successful online presence.

As such, assessing the appeal, user friendliness, and effectiveness of a web site is of substantial value to marketing managers, web site designers and user experience specialists; however, this information is typically difficult to obtain. Focus groups are sometimes used to achieve this goal but the process is long, expensive and not reliable, in part, due to the size and demographics of the focus group that may not be representative of the target customer base.

In more recent years advances have been made in the automation and implementation of mass online surveys for collecting user feedback information. Typically these systems include survey questions, or potentially a task on a website followed by feedback requests. While such systems are useful in collecting some information regarding user experiences, the studies often suffer from biases in responses, and limited types of feedback collected.

It is therefore apparent that an urgent need exists for advancements in the generation, implementation and analysis of studies into user experiences. Such systems and methods allow for improvements in website design, marketing and brand management.

SUMMARY

To achieve the foregoing and in accordance with the present invention, systems and methods for generating, administering and analyzing a user experience study. This enables the efficient generation of insights regarding the user experience so that the experience can be changed to improve the customer or user experience.

In some embodiments, the system and methods includes transcription analysis of a recording. The recording includes an audio and screenshot/video portion. The audio portion is transcribed using a machine learned model. Models may be selected by the recording quality and potentially accents or other speech patterns that are present. The transcription is then linked to the video/screen capture chronology, so that automatic scrolling is enabled, clip selection from the transcription, and searching to a video time is possible.

Automatic scrolling can be activated and deactivated at will by a user. Other actions, such as eye movement and sentiment may be extracted by the facial features or intonations found in the respective recordings.

When a clip is generated for the video based upon a selection of the transcription, the system may modify the clip length to avoid abrupt starts and finishes, thereby more closely mimicking a human directed edit. This may be accomplished by comparing the time between transcription selection, and other audio components in the recording. This is compared against thresholds based upon the part of speech, cultural biases and communication medium. The lower of the threshold or other audio segment may be employed to buffer the before and after timing of the clip, unless the audio segment delay is too low.

The systems may also allow the inclusion of annotations to be appended to the transcription/video file. These annotations can be searchable by keyword. The recording can likewise all be aggregated, allowing for results filtering by desired dimension. This can include success criteria, participant attribute (promoter versus detractor), and keywords.

In some other embodiments, there may be improvements to user experience question generation. Particularly, the system can enable improved navigation panes that allow for task generation, editing and reordering. Tasks can include 'star' based sentiment questions which are convertible to promoter versus detractor metrics. Spelling and grammar can be identified and corrected in real-time, and navigational decisions by the user can result in save alerts if the content on the current page has not been saved. Additionally, periodic auto-saving may also be enabled. Further, logic associated with any given task answer may be displayed to the user during task build.

On the backend, the review of study results has also been improved. As noted, this includes making overall questions with 'star' style answers that can be converted to promoter and detractor scores. Likewise multiple choice questions may be utilized, and all answers may be format able as either a value graph, histogram or pie chart. The results are filterable and can be presented as either total count and/or percentages. Legends corresponding to the actual answers can also be displayed for easier review.

Lastly, advances in managing the study participants have been made. The participants generate an account with a basic profile of mandatory data, and on the backend a hidden expanded profile is generated. The hidden account leverages public databases, as well as user provided information to more narrowly tailor study presentation to the participant (fewer "false start" studies where the participant is screened out of the study). The participants are then compensated based upon which studies they complete. Compensation is a factor of the size of the pool of participants that are eligible for it, study type, and duration of the study. The participant is also provided training videos and documentation.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 14, 15, 16A, 16B, 17-26, 27A-H and 28 are example screenshots of some embodiments of the user experience testing system.

DETAILED DESCRIPTION

Figure 1A:
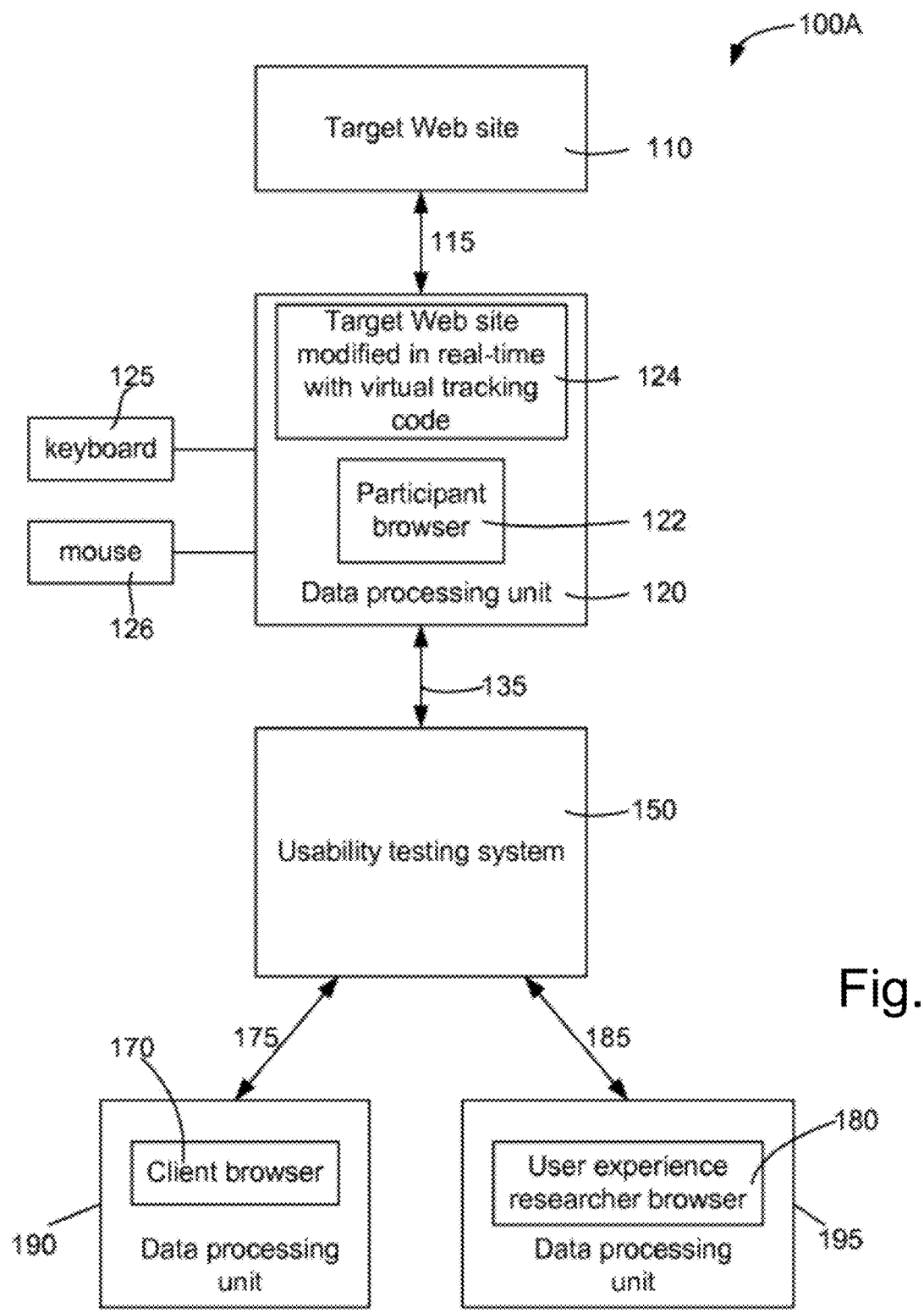
FIG. 1A is an example logical diagram of a system for user experience studies, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to enhancements to traditional user experience testing and subsequent insight generation. While such systems and methods may be utilized with any user experience environment, embodiments described in greater detail herein are directed to providing insights into user experiences in an online/webpage environment. Some descriptions of the present systems and methods will also focus nearly exclusively upon the user experience within a retailer's website. This is intentional in order to provide a clear use case and brevity to the disclosure, however it should be noted that the present systems and methods apply equally well to any situation where a user experience in an online platform is being studied. As such, the focus herein on a retail setting is in no way intended to artificially limit the scope of this disclosure.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are for improvements in natural language processing and actions taken in response to such message exchanges, within conversation systems, and for employment of domain specific assistant systems that leverage these enhanced natural language processing techniques. The goal of the message conversations is to enable a logical dialog exchange with a recipient, where the recipient is not necessarily aware that they are communicating with an automated machine as opposed to a human user. This may be most efficiently performed via a written dialog, such as email, text messaging, chat, etc. However, given the advancement in audio and video processing, it may be entirely possible to have the dialog include audio or video components as well.

In the following it is understood that the term usability refers to a metric scoring value for judging the ease of use of a target web site. A client refers to a sponsor who initiates and/or finances the usability study. The client may be, for example, a marketing manager who seeks to test the usability of a commercial web site for marketing (selling or advertising) certain products or services. Participants may be a selected group of people who participate in the usability study and may be screened based on a predetermined set of questions. Remote usability testing or remote usability study refers to testing or study in accordance with which participants (referred to use their computers, mobile devices or otherwise) access a target web site in order to provide feedback about the web site's ease of use, connection speed, and the level of satisfaction the participant experiences in using the web site. Unmoderated usability testing refers to communication with test participants without a moderator, e.g., a software, hardware, or a combined software/hardware system can automatically gather the participants' feedback and records their responses. The system can test a target web site by asking participants to view the web site, perform test tasks, and answer questions associated with the tasks.

To facilitate the discussion, FIG. 1 is a simplified block diagram of a user testing platform 100A according to an embodiment. Platform 100A is adapted to test a target web site 110. Platform 100A is shown as including a usability testing system 150 that is in communications with data processing units 120, 190 and 195. Data processing units 120, 190 and 195 may be a personal computer equipped with a monitor, a handheld device such as a tablet PC, an electronic notebook, a wearable device such as a cell phone, or a smart phone.

Data processing unit 120 includes a browser 122 that enables a user (e.g., usability test participant) using the data processing unit 120 to access target web site 110. Data processing unit 120 includes, in part, an input device such as a keyboard 125 or a mouse 126, and a participant browser 122. In one embodiment, data processing unit 120 may insert a virtual tracking code to target web site 110 in real-time while the target web site is being downloaded to the data processing unit 120. The virtual tracking code may be a proprietary JavaScript code, whereby the run-time data processing unit interprets the code for execution. The tracking code collects participants' activities on the downloaded web page such as the number of clicks, key strokes, keywords, scrolls, time on tasks, and the like over a period of time. Data processing unit 120 simulates the operations performed by the tracking code and is in communication with usability testing system 150 via a communication link 135. Communication link 135 may include a local area network, a metropolitan area network, and a wide area network. Such a communication link may be established through a physical wire or wirelessly. For example, the communication link may be established using an Internet protocol such as the TCP/IP protocol.

Activities of the participants associated with target web site 110 are collected and sent to usability testing system 150 via communication link 135. In one embodiment, data processing unit 120 may instruct a participant to perform predefined tasks on the downloaded web site during a usability test session, in which the participant evaluates the web site based on a series of usability tests. The virtual tracking code (e.g., a proprietary JavaScript) may record the participant's responses (such as the number of mouse clicks) and the time spent in performing the predefined tasks. The usability testing may also include gathering performance data of the target web site such as the ease of use, the connection speed, the satisfaction of the user experience. Because the web page is not modified on the original web site, but on the downloaded version in the participant data processing unit, the usability can be tested on any web sites including competitions' web sites.

Data collected by data processing unit 120 may be sent to the usability testing system 150 via communication link 135. In an embodiment, usability testing system 150 is further accessible by a client via a client browser 170 running on data processing unit 190. Usability testing system 150 is further accessible by user experience researcher browser 180 running on data processing unit 195. Client browser 170 is shown as being in communications with usability testing system 150 via communication link 175. User experience research browser 180 is shown as being in communications with usability testing system 150 via communications link 185. A client and/or user experience researcher may design one or more sets of questionnaires for screening participants and for testing the usability of a web site. Usability testing system 150 is described in detail below.

Figure 1B:
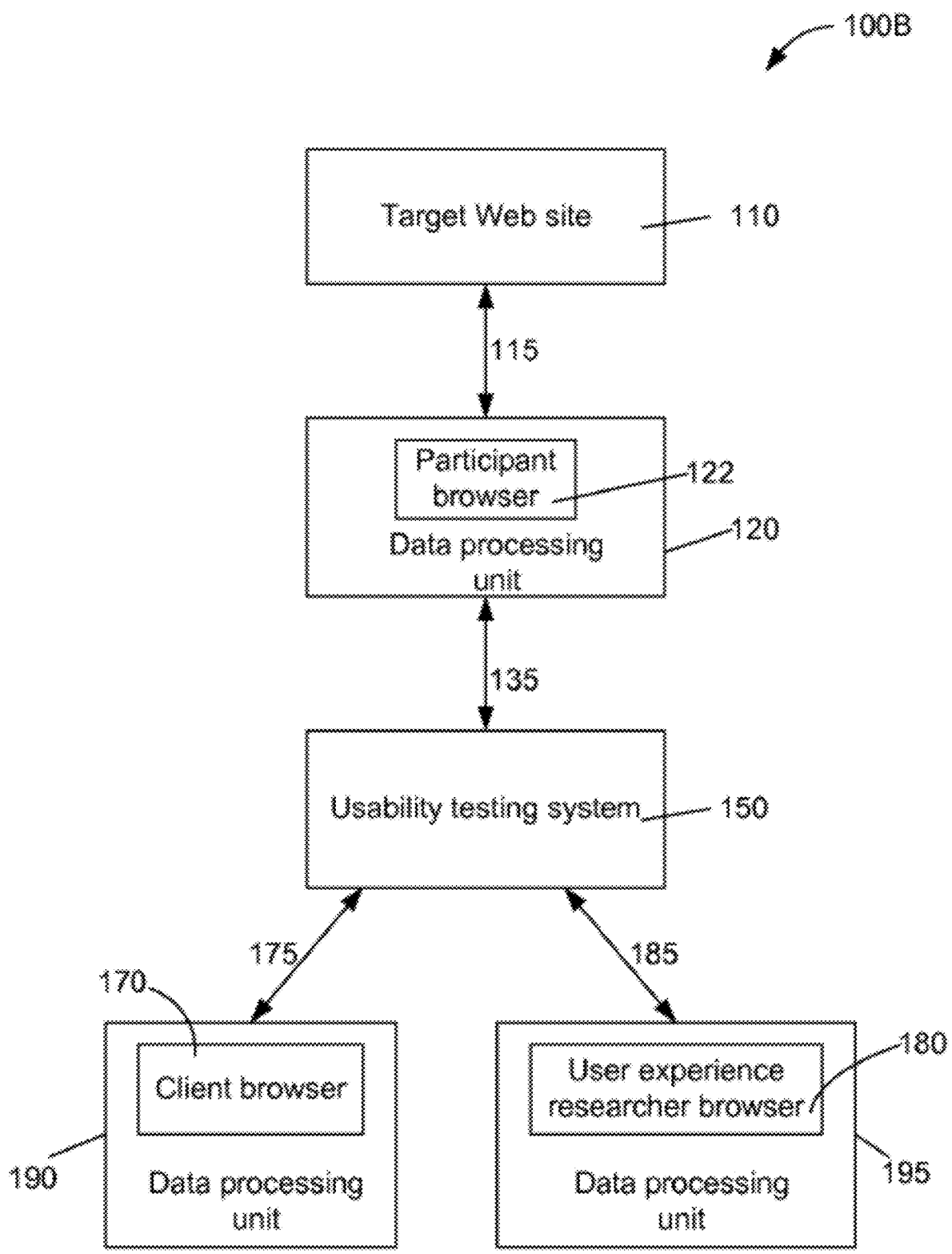
FIG. 1B is a second example logical diagram of a system for user experience studies, in accordance with some embodiment.

FIG. 1B is a simplified block diagram of a user testing platform 100B according to another embodiment of the present invention. Platform 100B is shown as including a target web site 110 being tested by one or more participants using a standard web browser 122 running on data processing unit 120 equipped with a display. Participants may communicate with a usability test system 150 via a communication link 135. Usability test system 150 may communicate with a client browser 170 running on a data processing unit 190. Likewise, usability test system 150 may communicate with user experience researcher browser running on data processing unit 195. Although a data processing unit is illustrated, one of skill in the art will appreciate that data processing unit 120 may include a configuration of multiple single-core or multi-core processors configured to process instructions, collect usability test data (e.g., number of clicks, mouse movements, time spent on each web page, connection speed, and the like), store and transmit the collected data to the usability testing system, and display graphical information to a participant via an input/output device (not shown).

Figure 1C:
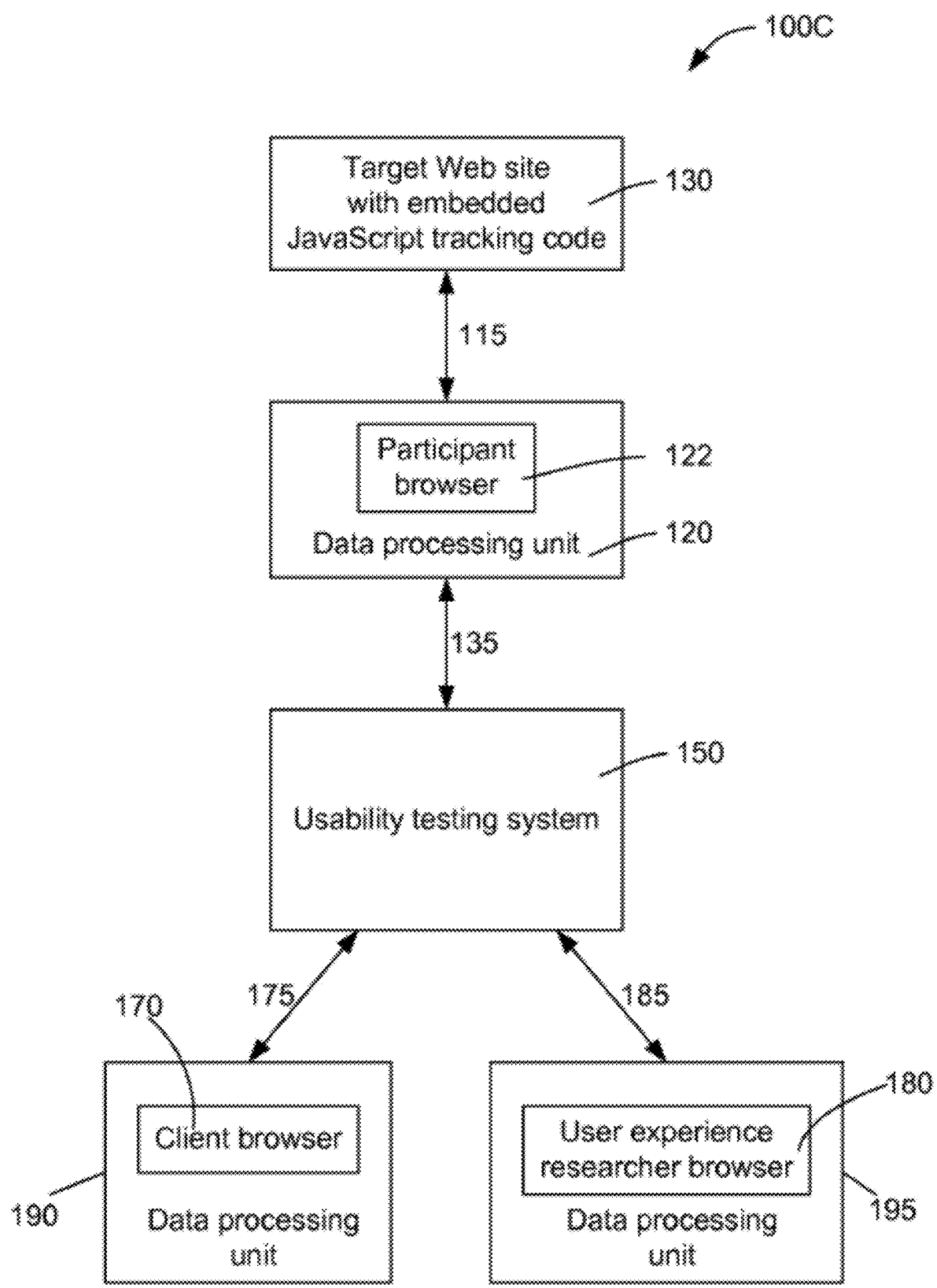
FIG. 1C is a third example logical diagram of a system for user experience studies, in accordance with some embodiment.

FIG. 1C is a simplified block diagram of a user testing platform 100C according to yet another embodiment of the present invention. Platform 100C is shown as including a target web site 130 being tested by one or more participants using a standard web browser 122 running on data processing unit 120 having a display. The target web site 130 is shown as including a tracking program code configured to track actions and responses of participants and send the tracked actions/responses back to the participant's data processing unit 120 through a communication link 115. Communication link 115 may be computer network, a virtual private network, a local area network, a metropolitan area network, a wide area network, and the like. In one embodiment, the tracking program is a JavaScript configured to run tasks related to usability testing and sending the test/study results back to participant's data processing unit for display. Such embodiments advantageously enable clients using client browser 170 as well as user experience researchers using user experience research browser 180 to design mockups or prototypes for usability testing of variety of web site layouts. Data processing unit 120 may collect data associated with the usability of the target web site and send the collected data to the usability testing system 150 via a communication link 135.

In one exemplary embodiment, the testing of the target web site (page) may provide data such as ease of access through the Internet, its attractiveness, ease of navigation, the speed with which it enables a user to complete a transaction, and the like. In another exemplary embodiment, the testing of the target web site provides data such as duration of usage, the number of keystrokes, the user's profile, and the like. It is understood that testing of a web site in accordance with embodiments of the present invention can provide other data and usability metrics. Information collected by the participant's data processing unit is uploaded to usability testing system 150 via communication link 135 for storage and analysis.

Figure 2:
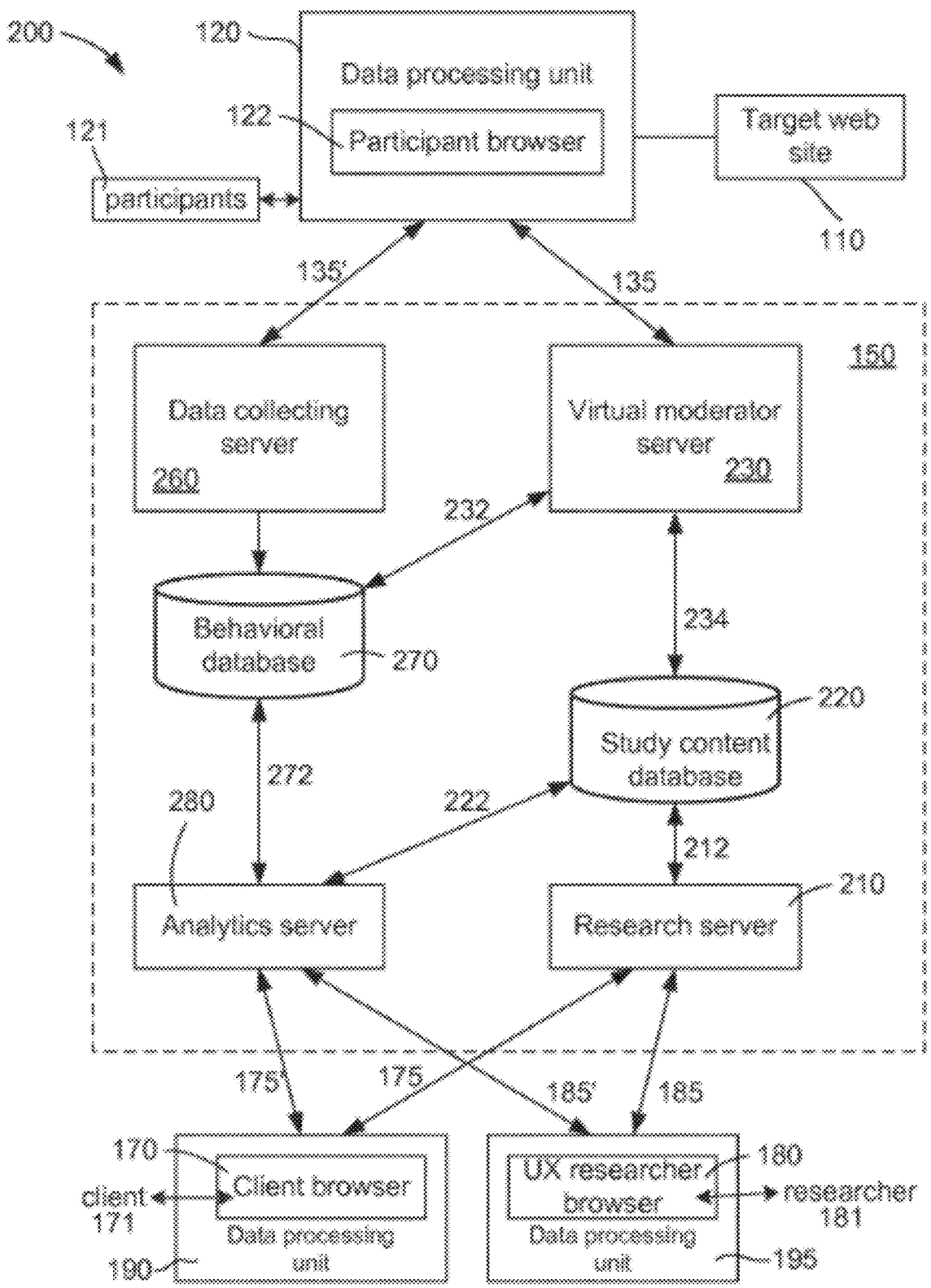
FIG. 2 is an example logical diagram of the usability testing system, in accordance with some embodiment.

FIG. 2 is a simplified block diagram of an exemplary embodiment platform 200 according to one embodiment of the present invention. Platform 200 is shown as including, in part, a usability testing system 150 being in communications with a data processing unit 125 via communications links 135 and 135'. Data processing unit 125 includes, in part, a participant browser 120 that enables a participant to access a target web site 110. Data processing unit 125 may be a personal computer, a handheld device, such as a cell phone, a smart phone or a tablet PC, or an electronic notebook. Data processing unit 125 may receive instructions and program codes from usability testing system 150 and display pre-defined tasks to participants 120. The instructions and program codes may include a web-based application that instructs participant browser 122 to access the target web site 110. In one embodiment, a tracking code is inserted to the target web site 110 that is being downloaded to data processing unit 125. The tracking code may be a JavaScript code that collects participants' activities on the downloaded target web site such as the number of clicks, key strokes, movements of the mouse, keywords, scrolls, time on tasks and the like performed over a period of time.

Data processing unit 125 may send the collected data to usability testing system 150 via communication link 135' which may be a local area network, a metropolitan area network, a wide area network, and the like and enable usability testing system 150 to establish communication with data processing unit 125 through a physical wire or wirelessly using a packet data protocol such as the TCP/IP protocol or a proprietary communication protocol.

Usability testing system 150 includes a virtual moderator software module running on a virtual moderator server 230 that conducts interactive usability testing with a usability test participant via data processing unit 125 and a research module running on a research server 210 that may be connected to a user research experience data processing unit 195. User experience researcher 181 may create tasks relevant to the usability study of a target web site and provide the created tasks to the research server 210 via a communication link 185. One of the tasks may be a set of questions designed to classify participants into different categories or to prescreen participants. Another task may be, for example, a set of questions to rate the usability of a target web site based on certain metrics such as ease of navigating the web site, connection speed, layout of the web page, ease of finding the products (e.g., the organization of product indexes). Yet another tasks may be a survey asking participants to press a "yes" or "no" button or write short comments about participants' experiences or familiarity with certain products and their satisfaction with the products. All these tasks can be stored in a study content database 220, which can be retrieved by the virtual moderator module running on virtual moderator server 230 to forward to participants 120. Research module running on research server 210 can also be accessed by a client (e.g., a sponsor of the usability test) 171 who, like user experience researchers 181, can design her own questionnaires since the client has a personal interest to the target web site under study. Client 171 can work together with user experience researchers 181 to create tasks for usability testing. In an embodiment, client 171 can modify tasks or lists of questions stored in the study content database 220. In another embodiment, client 171 can add or delete tasks or questionnaires in the study content database 220. In yet another embodiment, client 171 may be user experience researcher 181.

In some embodiment, one of the tasks may be open or closed card sorting studies for optimizing the architecture and layout of the target web site. Card sorting is a technique that shows how online users organize content in their own mind. In an open card sort, participants create their own names for the categories. In a closed card sort, participants are provided with a predetermined set of category names. Client 171 and/or user experience researcher 181 can create proprietary online card sorting tool that executes card sorting exercises over large groups of participants in a rapid and cost-effective manner. In an embodiment, the card sorting exercises may include up to 100 items to sort and up to 12 categories to group. One of the tasks may include categorization criteria such as asking participants questions "why do you group these items like this?." Research module on research server 210 may combine card sorting exercises and online questionnaire tools for detailed taxonomy analysis. In an embodiment, the card sorting studies are compatible with SPSS applications.

In an embodiment, the card sorting studies can be assigned randomly to participant 120. User experience (UX) researcher 181 and/or client 171 may decide how many of those card sorting studies each participant is required to complete. For example, user experience researcher 181 may create a card sorting study within 12 tasks, group them in 4 groups of 3 tasks and manage that each participant just has to complete one task of each group.

After presenting the thus created tasks to participants 120 through virtual moderator module (running on virtual moderator serer 230) and communication link 135, the actions/responses of participants will be collected in a data collecting module running on a data collecting server 260 via a communication link 135'. In an embodiment, communication link 135' may be a distributed computer network and share the same physical connection as communication link 135. This is, for example, the case where data collecting module 260 locates physically close to virtual moderator module 230, or if they share the usability testing system's processing hardware. In the following description, software modules running on associated hardware platforms will have the same reference numerals as their associated hardware platform. For example, virtual moderator module will be assigned the same reference numeral as the virtual moderator server 230, and likewise data collecting module will have the same reference numeral as the data collecting server 260.

Data collecting module 260 may include a sample quality control module that screens and validates the received responses, and eliminates participants who provide incorrect responses, or do not belong to a predetermined profile, or do not qualify for the study. Data collecting module 260 may include a "binning" module that is configured to classify the validated responses and stores them into corresponding categories in a behavioral database 270.

Merely as an example, responses may include gathered web site interaction events such as clicks, keywords, URLs, scrolls, time on task, navigation to other web pages, and the like. In one embodiment, virtual moderator server 230 has access to behavioral database 270 and uses the content of the behavioral database to interactively interface with participants 120. Based on data stored in the behavioral database, virtual moderator server 230 may direct participants to other pages of the target web site and further collect their interaction inputs in order to improve the quantity and quality of the collected data and also encourage participants' engagement. In one embodiment, virtual moderator server may eliminate one or more participants based on data collected in the behavioral database. This is the case if the one or more participants provide inputs that fail to meet a predetermined profile.

Usability testing system 150 further includes an analytics module 280 that is configured to provide analytics and reporting to queries coming from client 171 or user experience (UX) researcher 181. In an embodiment, analytics module 280 is running on a dedicated analytics server that offloads data processing tasks from traditional servers. Analytics server 280 is purpose-built for analytics and reporting and can run queries from client 171 and/or user experience researcher 181 much faster (e.g., 100 times faster) than conventional server system, regardless of the number of clients making queries or the complexity of queries. The purpose-built analytics server 280 is designed for rapid query processing and ad hoc analytics and can deliver higher performance at lower cost, and, thus provides a competitive advantage in the field of usability testing and reporting and allows a company such as UserZoom (or Xperience Consulting, SL) to get a jump start on its competitors.

In an embodiment, research module 210, virtual moderator module 230, data collecting module 260, and analytics server 280 are operated in respective dedicated servers to provide higher performance. Client (sponsor) 171 and/or user experience research 181 may receive usability test reports by accessing analytics server 280 via respective links 175' and/or 185'. Analytics server 280 may communicate with behavioral database via a two-way communication link 272.

In an embodiment, study content database 220 may include a hard disk storage or a disk array that is accessed via iSCSI or Fibre Channel over a storage area network. In an embodiment, the study content is provided to analytics server 280 via a link 222 so that analytics server 280 can retrieve the study content such as task descriptions, question texts, related answer texts, products by category, and the like, and generate together with the content of the behavioral database 270 comprehensive reports to client 171 and/or user experience researcher 181.

Shown in FIG. 2 is a connection 232 between virtual moderator server 230 and behavioral database 270. Behavioral database 270 can be a network attached storage server or a storage area network disk array that includes a two-way communication via link 232 with virtual moderator server 230. Behavioral database 270 is operative to support virtual moderator server 230 during the usability testing session. For example, some questions or tasks are interactively presented to the participants based on data collected. It would be advantageous to the user experience researcher to set up specific questions that enhance the usability testing if participants behave a certain way. If a participant decides to go to a certain web page during the study, the virtual moderator server 230 will pop up corresponding questions related to that page; and answers related to that page will be received and screened by data collecting server 260 and categorized in behavioral database server 270. In some embodiments, virtual moderator server 230 operates together with data stored in the behavioral database to proceed the next steps. Virtual moderator server, for example, may need to know whether a participant has successfully completed a task, or based on the data gathered in behavioral database 270, present another tasks to the participant.

Referring still to FIG. 2, client 171 and user experience researcher 181 may provide one or more sets of questions associated with a target web site to research server 210 via respective communication link 175 and 185. Research server 210 stores the provided sets of questions in a study content database 220 that may include a mass storage device, a hard disk storage or a disk array being in communication with research server 210 through a two-way interconnection link 212. The study content database may interface with virtual moderator server 230 through a communication link 234 and provides one or more sets of questions to participants via virtual moderator server 230.

Figure 3A:
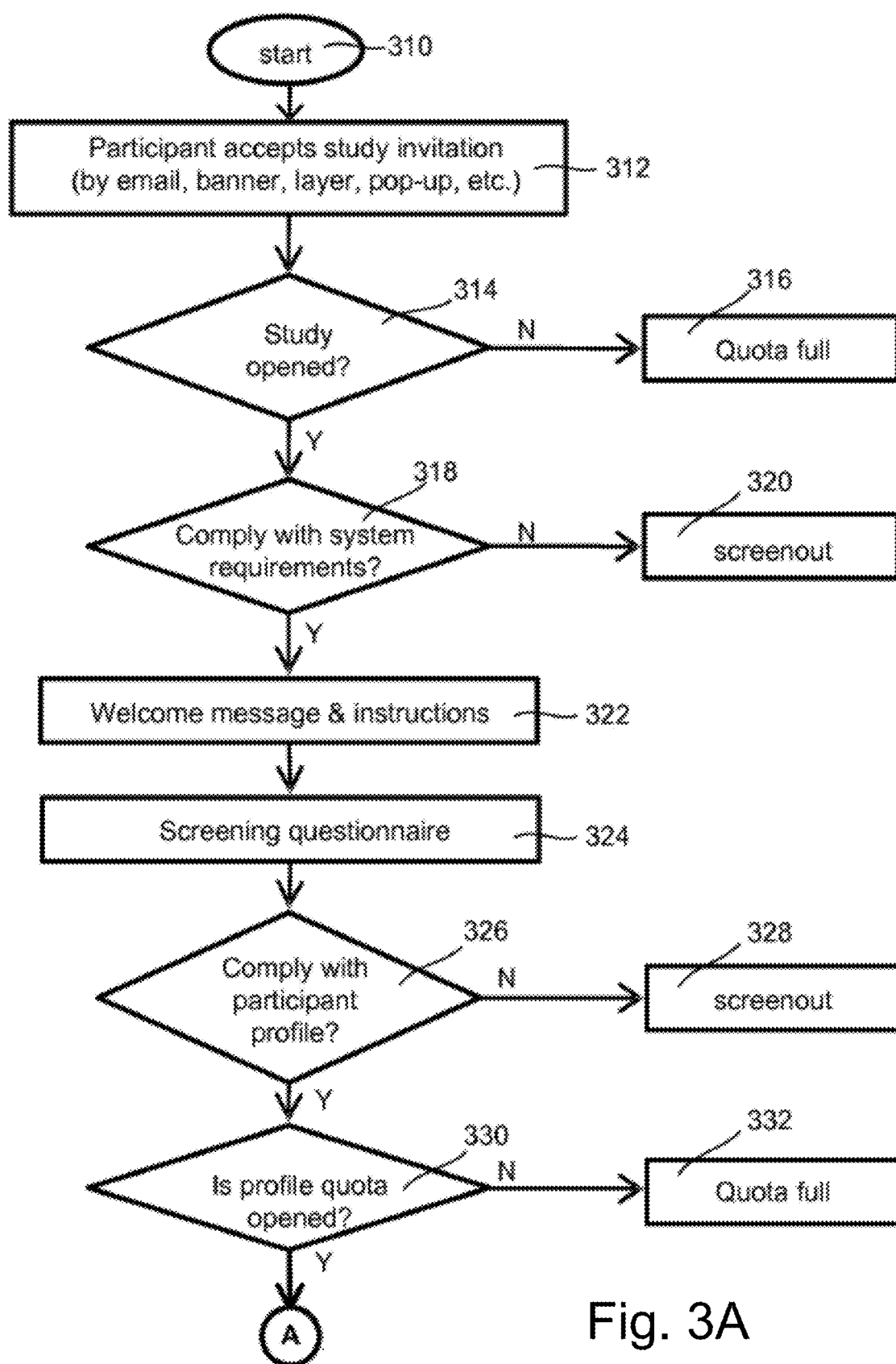
FIG. 3A is a flow diagram illustrating an exemplary process of interfacing with potential candidates and pre-screening participants for the usability testing according to an embodiment of the present invention.

FIG. 3A is a flow diagram of an exemplary process of interfacing with potential candidates and prescreening participants for the usability testing according to one embodiment of the present invention. The process starts at step 310. Initially, potential candidates for the usability testing may be recruited by email, advertisement banners, pop-ups, text layers, overlays, and the like (step 312). The number of candidates who have accepted the invitation to the usability test will be determined at step 314. If the number of candidates reaches a predetermined target number, then other candidates who have signed up late may be prompted with a message thanking for their interest and that they may be considered for a future survey (shown as "quota full" in step 316). At step 318, the usability testing system further determines whether the participants' browser comply with a target web site browser. For example, user experience researchers or the client may want to study and measure a web site's usability with regard to a specific web browser (e.g., Microsoft Edge) and reject all other browsers. Or in other cases, only the usability data of a web site related to Opera or Chrome will be collected, and Microsoft Edge or FireFox will be rejected at step 320. At step 322, participants will be prompted with a welcome message and instructions are presented to participants that, for example, explain how the usability testing will be performed, the rules to be followed, and the expected duration of the test, and the like. At step 324, one or more sets of screening questions may be presented to collect profile information of the participants. Questions may relate to participants' experience with certain products, their awareness with certain brand names, their gender, age, education level, income, online buying habits, and the like. At step 326, the system further eliminates participants based on the collected information data. For example, only participants who have used the products under study will be accepted or screened out (step 328). At step 330, a quota for participants having a target profile will be determined. For example, half of the participants must be female, and they must have online purchase experience or have purchased products online in recent years.

Figure 3B:
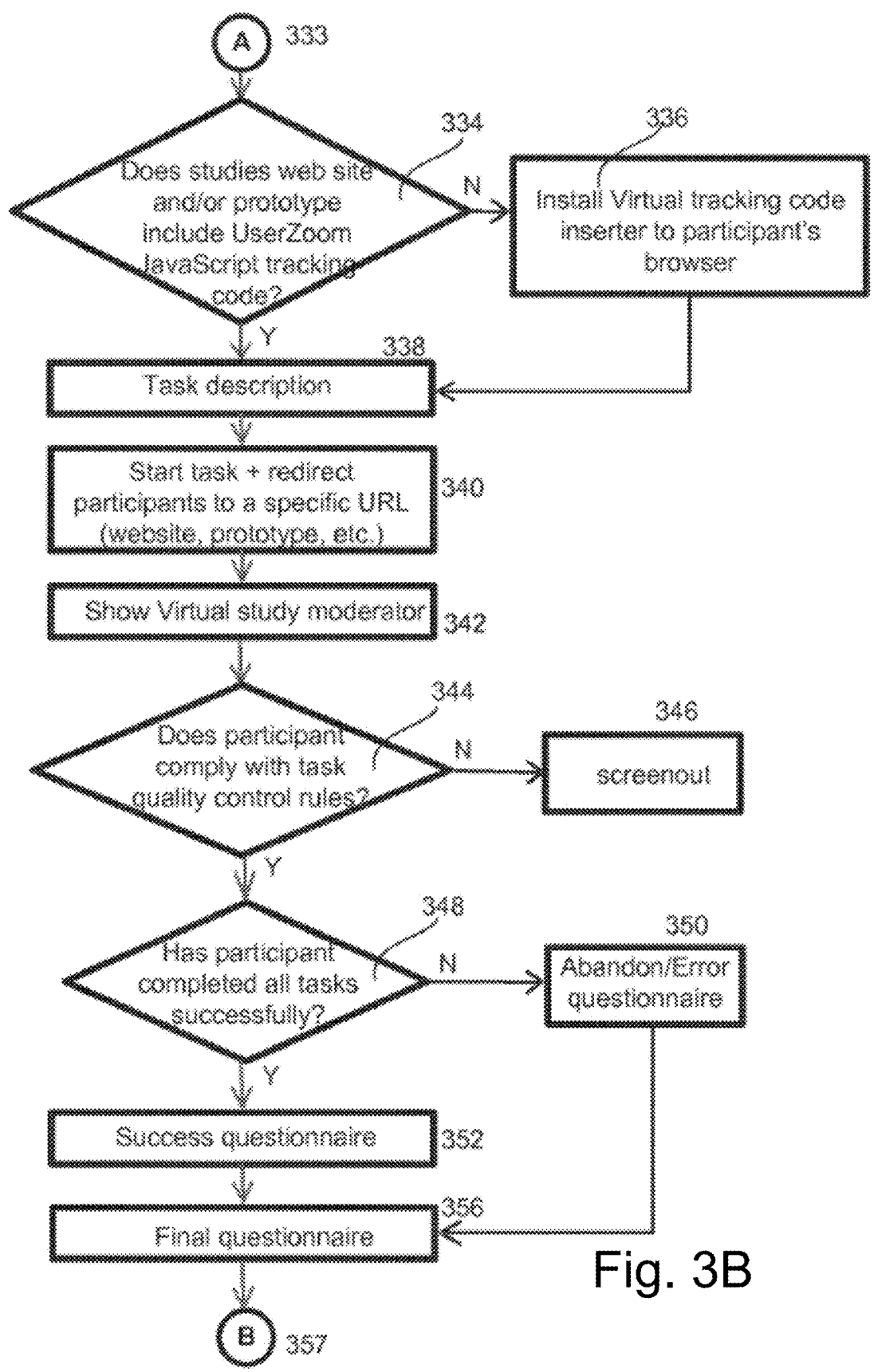
FIG. 3B is a flow diagram of an exemplary process for collecting usability data of a target web site according to an embodiment of the present invention.

FIG. 3B is a flow diagram of an exemplary process for gathering usability data of a target web site according to an embodiment of the present invention. At step 334, the target web site under test will be verified whether it includes a proprietary tracking code. In an embodiment, the tracking code is a UserZoom JavaScript code that pop-ups a series of tasks to the pre-screened participants. If the web site under study includes a proprietary tracking code (this corresponds to the scenario shown in FIG. 1C), then the process proceeds to step 338. Otherwise, a virtual tracking code will be inserted to participants' browser at step 336. This corresponds to the scenario described above in FIG. 1A.

The following process flow is best understood together with FIG. 2. At step 338, a task is described to participants. The task can be, for example, to ask participants to locate a color printer below a given price. At step 340, the task may redirect participants to a specific web site such as eBay, HP, or Amazon.com. The progress of each participant in performing the task is monitored by a virtual study moderator at step 342. At step 344, responses associated with the task are collected and verified against the task quality control rules. The step 344 may be performed by the data collecting module 260 described above and shown in FIG. 2. Data collecting module 260 ensures the quality of the received responses before storing them in a behavioral database 270 (FIG. 2). Behavioral database 270 may include data that the client and/or user experience researcher want to determine such as how many web pages a participant viewed before selecting a product, how long it took the participant to select the product and complete the purchase, how many mouse clicks and text entries were required to complete the purchase and the like. A number of participants may be screened out (step 346) during step 344 for non-complying with the task quality control rules and/or the number of participants may be required to go over a series of training provided by the virtual moderator module 230. At step 348, virtual moderator module 230 determines whether or not participants have completed all tasks successfully. If all tasks are completed successfully (e.g., participants were able to find a web page that contains the color printer under the given price), virtual moderator module 230 will prompt a success questionnaire to participants at step 352. If not, then virtual moderator module 230 will prompt an abandon or error questionnaire to participants who did not complete all tasks successfully to find out the causes that lead to the incompletion. Whether participants have completed all task successfully or not, they will be prompted a final questionnaire at step 356.

Figure 3C:
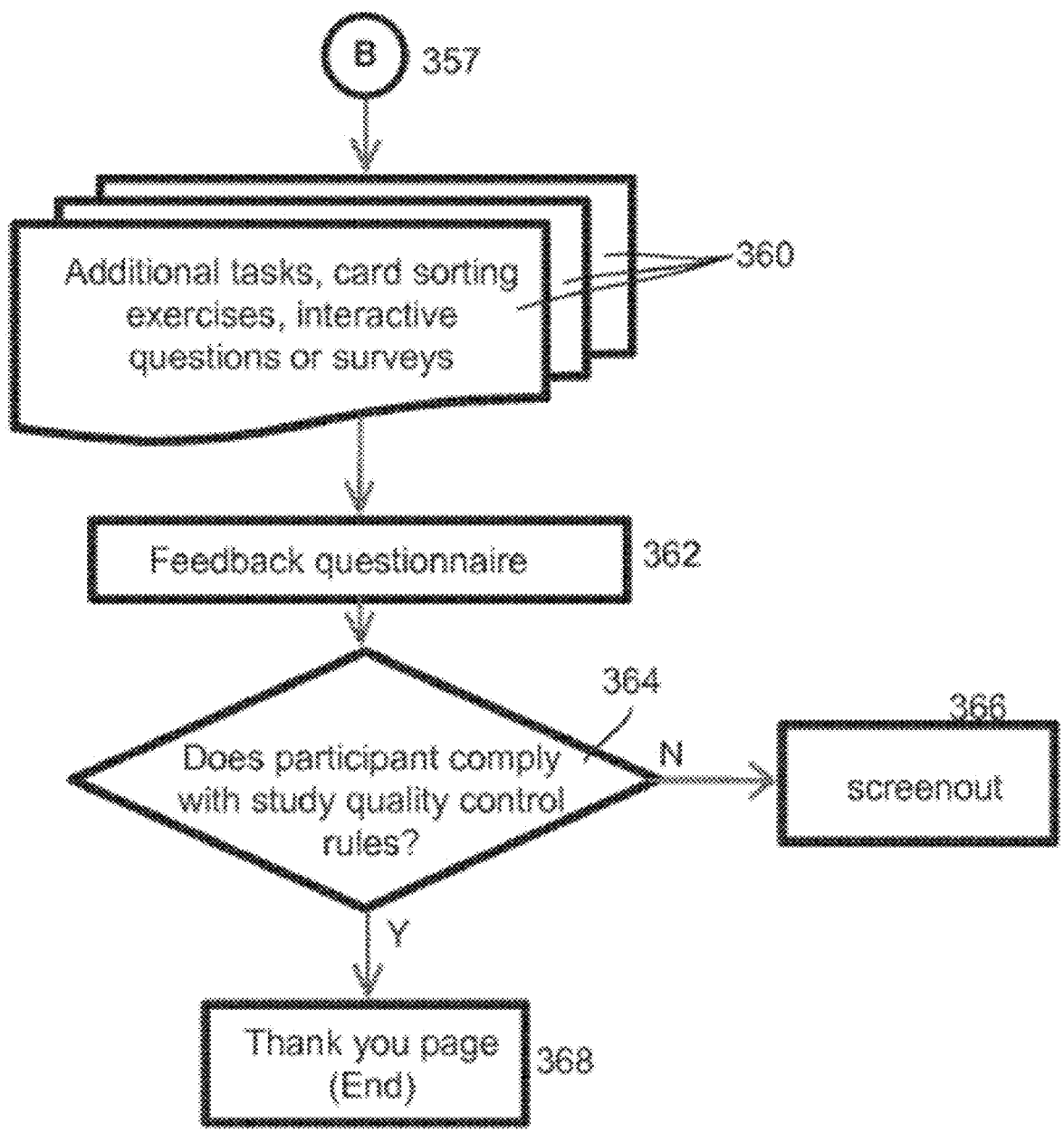
FIG. 3C is a flow diagram of an exemplary process for card sorting studies according to an embodiment of the present invention.

FIG. 3C is a flow diagram of an exemplary process for card sorting studies according to one embodiment of the present invention. At step 360, participants may be prompted with additional tasks such as card sorting exercises. Card sorting is a powerful technique for assessing how participants or visitors of a target web site group related concepts together based on the degree of similarity or a number of shared characteristics. Card sorting exercises may be time consuming. In an embodiment, participants will not be prompted all tasks but only a random number of tasks for the card sorting exercise. For example, a card sorting study is created within 12 tasks that are grouped in 6 groups of 2 tasks. Each participant just needs to complete one task of each group. It should be appreciated to one person of skill in the art that many variations, modifications, and alternatives are possible to randomize the card sorting exercise to save time and cost. Once the card sorting exercises are completed, participants are prompted with a questionnaire for feedback at step 362. The feedback questionnaire may include one or more survey questions such as a subjective rating of target web site attractiveness, how easy the product can be used, features that participants like or dislike, whether participants would recommend the products to others, and the like. At step 364, the results of the card sorting exercises will be analyzed against a set of quality control rules, and the qualified results will be stored in the behavioral database 270. In an embodiment, the analyze of the result of the card sorting exercise is performed by a dedicated analytics server 280 that provides much higher performance than general-purpose servers to provide higher satisfaction to clients. If participants complete all tasks successfully, then the process proceeds to step 368, where all participants will be thanked for their time and/or any reward may be paid out. Else, if participants do not comply or cannot complete the tasks successfully, the process proceeds to step 366 that eliminates the non-compliant participants.

Figure 4:
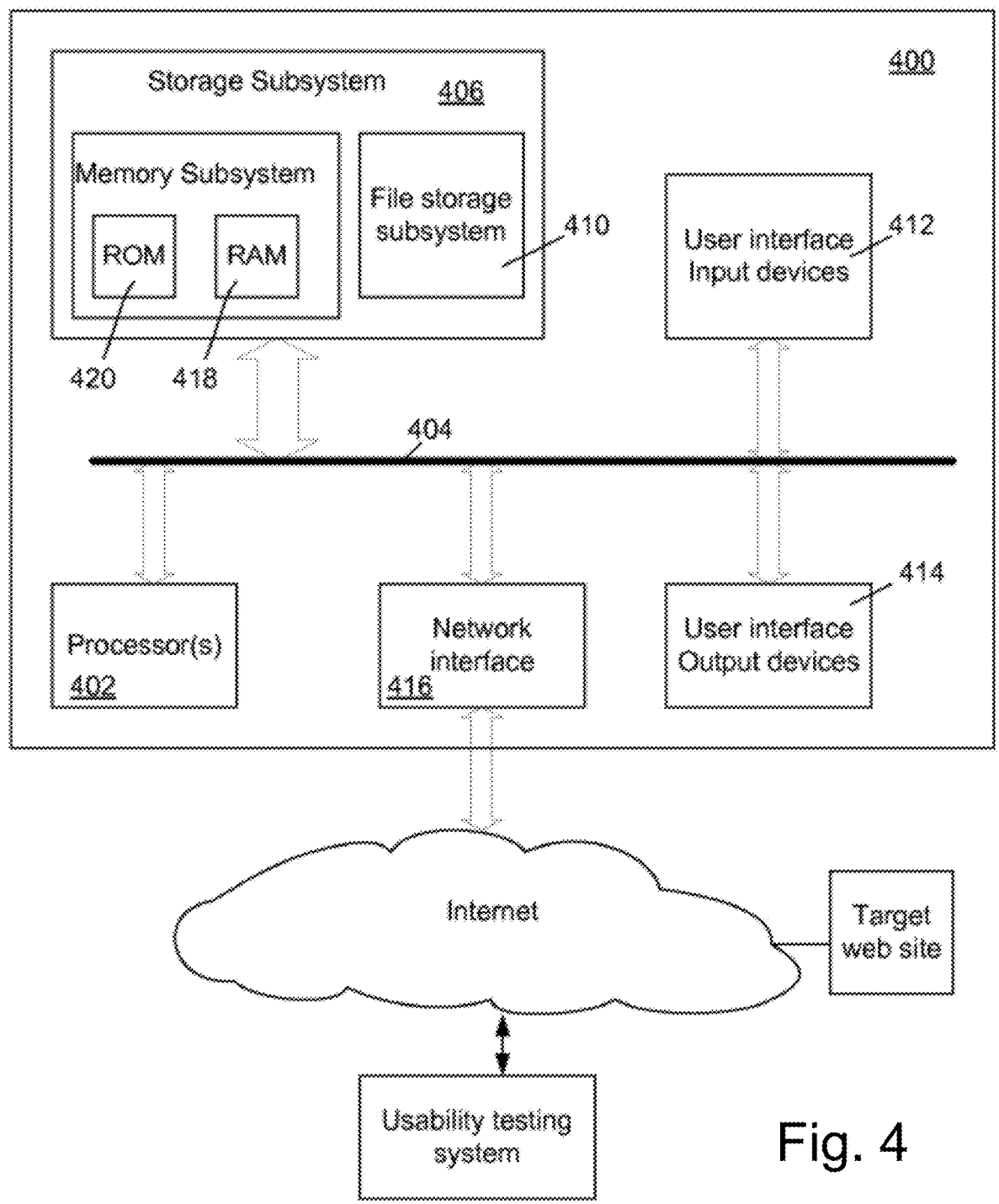
FIG. 4 is a simplified block diagram of a data processing unit configured to enable a participant to access a web site and track participant's interaction with the web site according to an embodiment of the present invention.

FIG. 4 illustrates an example of a suitable data processing unit 400 configured to connect to a target web site, display web pages, gather participant's responses related to the displayed web pages, interface with a usability testing system, and perform other tasks according to an embodiment of the present invention. System 400 is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416 that may include a wireless communication port. The input and output devices allow user interaction with data processing system 402. Bus system 404 may be any of a variety of bus architectures such as ISA bus, VESA bus, PCI bus and others. Bus subsystem 404 provides a mechanism for enabling the various components and subsystems of the processing device to communicate with each other. Although bus subsystem 404 is shown schematically as a single bus, alternative embodiments of the bus subsystem may utilize multiple busses.

User interface input devices 412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device. User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 406. These software modules may be executed by processor(s) 402. Such software modules can include codes configured to access a target web site, codes configured to modify a downloaded copy of the target web site by inserting a tracking code, codes configured to display a list of predefined tasks to a participant, codes configured to gather participant's responses, and codes configured to cause participant to participate in card sorting exercises. Storage subsystem 406 may also include codes configured to transmit participant's responses to a usability testing system.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Figure 5:
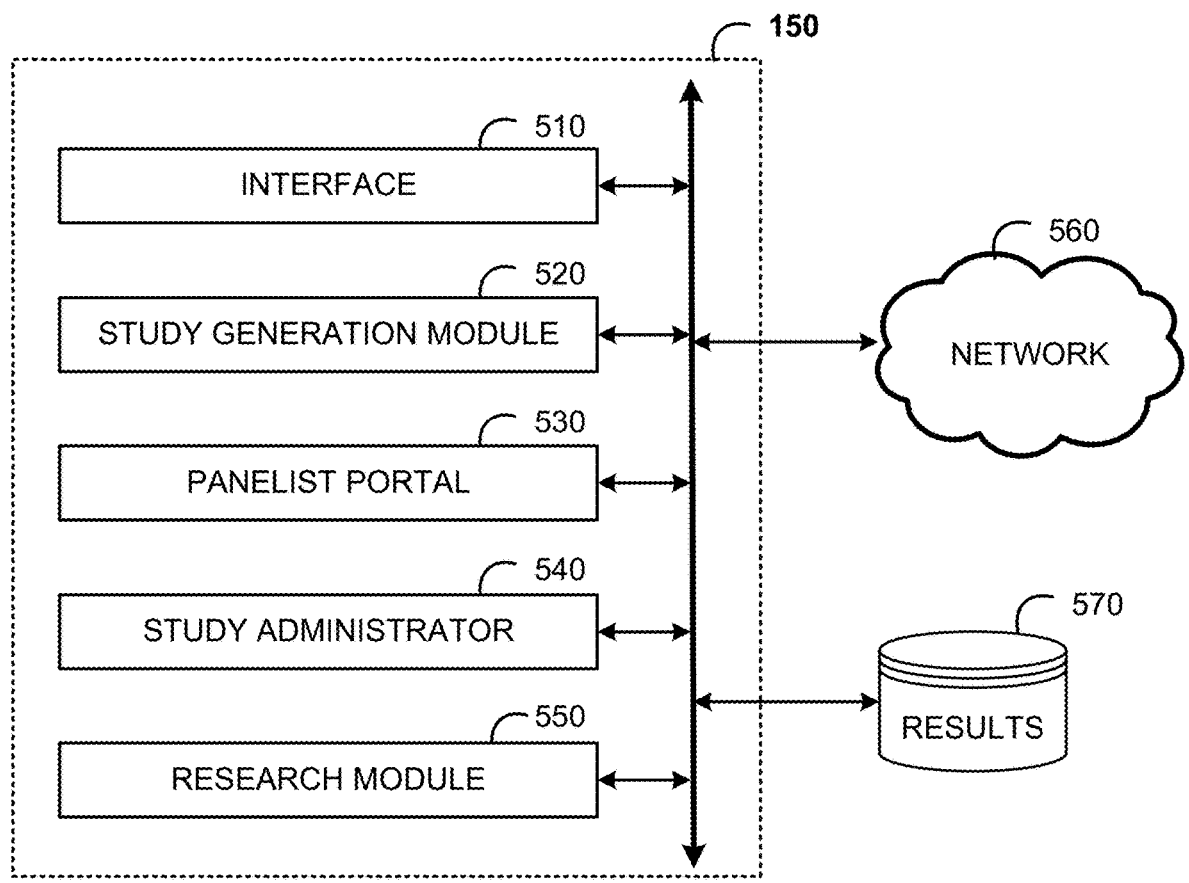
FIG. 5 is an example logical diagram of a second substantiation of the usability testing system, in accordance with some embodiment.

Now that systems and methods of usability testing have been described at a high level, attention will be directed to a particular set of embodiments of the systems and methods for user experience testing that allows for advanced insight generation. This begins with a usability testing system 150 as seen in relation to FIG. 5. In this substantiation of the usability testing system 150 a number of subcomponents are seen as logically connected with one another, including an interface 510 for accessing the results 570 which may be stored internally or in an external data repository. The interface is also configured to couple with the network 560, which most typically is the Internet, as previously discussed.

The other significant components of the user experience testing system 150 includes a study generation module 520, a panelist portal 530, a study administrator 540 and a research module 550, each of which will be described in greater detail below. Each of the components of the user experience testing systems 150 may be physically or logically coupled, allowing for the output of any given component to be used by the other components as needed.

Figure 6:
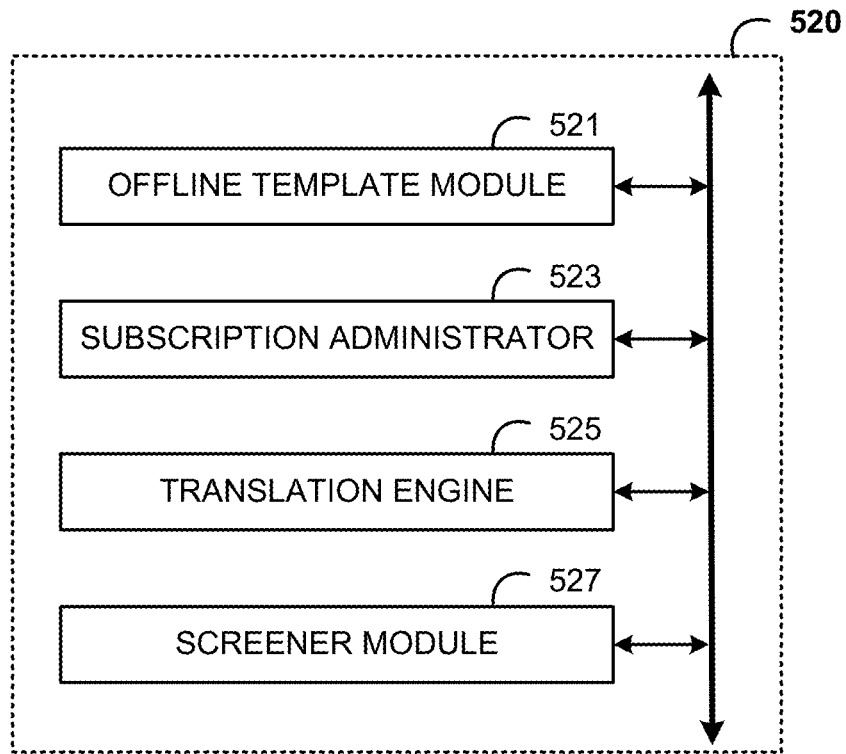
FIG. 6 is a logical diagram of the study generation module, in accordance with some embodiment.

Turning to FIG. 6, the study generation module 520 is provided in greater detail. An offline template module 521 provides a system user with templates in a variety of languages (pre-translated templates) for study generation, screener questions and the like, based upon study type. Users are able to save any screener question, study task, etc. for usage again at a later time or in another study.

In some embodiments a user may be able to concurrently design an unlimited number of studies, but is limited in the deployment of the studies due to the resource expenditure of participants and computational expense of the study insight generation. As such, a subscription administrator 523 manages the login credentialing, study access and deployment of the created studies for the user. In some embodiments, the user is able to have subscriptions that scale in pricing based upon the types of participants involved in a stud, and the number of studies concurrently deployable by the user/client.

The translation engine 525 may include machine translation services for study templates and even allow on the fly question translations. A screener module 527 is configured to allow for the generation of screener questions to weed through the participants to only those that are suited for the given study. This may include basic Boolean expressions with logical conditions to select a particular demographic for the study. However, the screener module 527 may also allow for advanced screener capabilities where screener groups and quotas are defined, allowing for advanced logical conditions to segment participants. For example, the study may wish to include a group of 20 women between the ages of 25-45 and a group of men who are between the ages of 40-50 as this may more accurately reflect the actual purchasing demographic for a particular retailer. A single participant screening would be unable to generate this mix of participants, so the advanced screener interface is utilized to ensure the participants selected meet the user's needs for the particular study.

Figure 7:
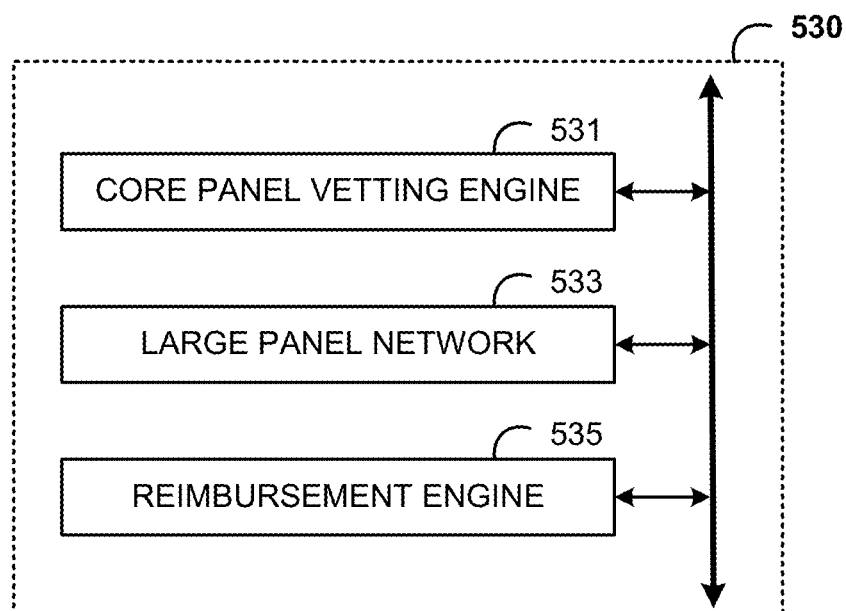
FIG. 7 is a logical diagram of the recruitment engine, in accordance with some embodiment.

Turning now to FIG. 7, a more detailed illustration of the participant portal 530 is provided. The participant portal 530 is responsible for the recruiting and management of participants for the studies. Generally, participants are one of three different classes: 1) core panel participants, 2) general panel participants, and 3) client provided participants. The core panel participants are compensated at a greater rate, but must first be vetted for their ability and willingness to provide comprehensive user experience reviews. Significant demographic and personal information can be collected for these core panel participants, which can enable powerful downstream analytics. The core panel vetting engine 531 collects public information automatically for the participants as well as eliciting information from the participant to determine if the individual is a reliable panelists. Traits like honesty and responsiveness may be ascertained by comparing the information derived from public sources to the participant supplied information. Additionally, the participant may provide a video sample of a study. This sample is reviewed for clarity and communication proficiency as part of the vetting process. If a participant is successfully vetted they are then added to a database of available core panelists. Core panelists have an expectation of reduced privacy, and may pre-commit to certain volumes and/or activities.

Beyond the core panel is a significantly larger pool of participants in a general panel participant pool. This pool of participants may have activities that they are unwilling to engage in (e.g., audio and video recording for example), and are required to provide less demographic and personal information than core panelists. In turn, the general panel participants are generally provided a lower compensation for their time than the core panelists. Additionally, the general panel participants may be a shared pooling of participants across many user experience and survey platforms. This enables a demographically rich and large pool of individuals to source from. A large panel network 533 manages this general panel participant pool.

Lastly, the user or client may already have a set of participants they wish to use in their testing. For example, if the user experience for an employee benefits portal is being tested, the client will wish to test the study on their own employees rather than the general public.

A reimbursement engine 535 is involved with compensating participants for their time (often on a per study basis). Different studies may be 'worth' differing amounts based upon the requirements (e.g., video recording, surveys, tasks, etc.) or the expected length to completion. Additionally, the compensation between general panelists and core panelists may differ even for the same study. Generally, client supplied participants are not compensated by the reimbursement engine 535 as the compensation (if any) is directly negotiated between the client and the participants.

Figure 8:
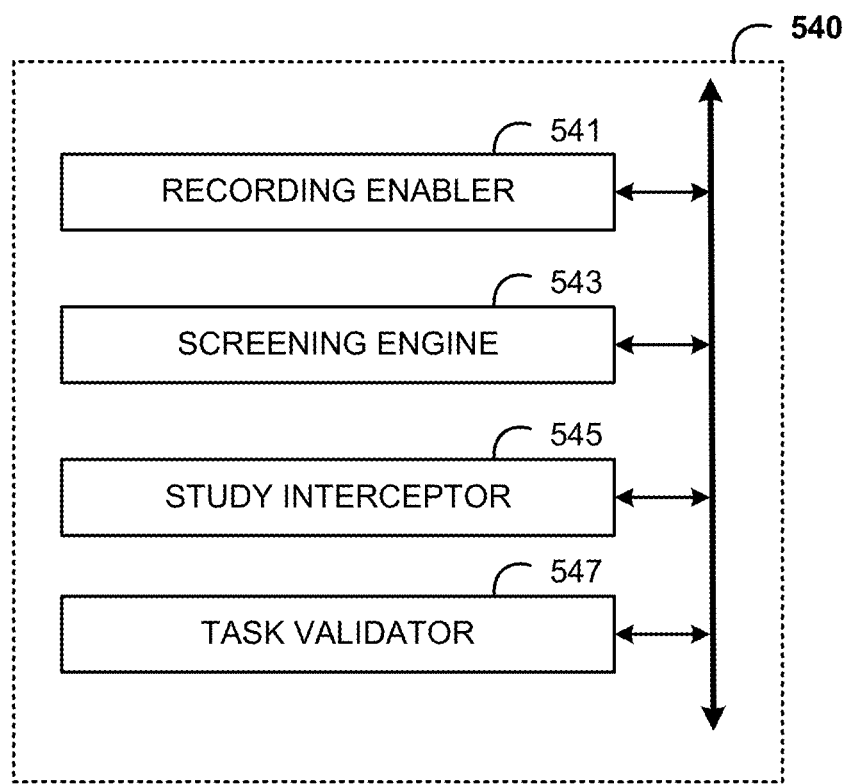
FIG. 8 is a logical diagram of the study administrator, in accordance with some embodiment.

Turning now to FIG. 8, a more detailed view of the study administrator 540 is provided. Unlike many other user experience testing programs, the presently disclosed systems and methods include the ability to record particular activities by the user. A recording enabler 541 allows for the collection of click-flow information, audio collection and even video recording. In the event of audio and/or video recording the recording only occurs during the study in order to preserve participant privacy, and to focus attention on only time periods that will provide insights into the user experience. Thus, while the participant is engaged in screening questions or other activities recording may be disabled to prevent needless data accumulation. Recording only occurs after user acceptance (to prevent running afoul of privacy laws and regulations), and during recording the user may be presented with a clear indication that the session is being recorded. For example the user may be provided a thumbnail image of the video capture, in some embodiments. This provides notice to the user of the video recording, and also indicates video quality and field of view information, thereby allowing them to readjust the camera if needed or take other necessary actions (avoiding harsh backlight, increasing ambient lighting, etc.).

The screening engine 543 administers the generated screener questions for the study. Screener questions, as previously disclosed, includes questions to the potential participants that may qualify or disqualify them from a particular study. For example, in a given study, the user may wish to target men between the ages of 21 and 35, for example. Questions regarding age and gender may be used in the screener questions to enable selection of the appropriate participants for the given study. Additionally, based upon the desired participant pool being used, the participants may be pre-screened by the system based upon known demographic data. For the vetted core panelists the amount of personal data known may be significant, thereby focusing in on eligible participants with little to no additional screener questions required. For the general panel population, however, less data is known, and often all but the most rudimentary qualifications may be performed automatically. After this qualification filtering of the participants, they may be subjected to the screener questions as discussed above.

In some embodiments it may be desirable to interrupt a study in progress in order to interject a new concept, offer or instruction. Particularly, in a mobile application there can be a software developer kit (SDK) that enables the integration into the study and interruption of the user in-process. The study interceptor 545 manages this interruptive activity. Interruption of the user experience allows for immediate feedback testing or prompts to have the participant do some other activity. For example, the interrupt may be configured to trigger when some event or action is taken, such as the participant visiting a particular URL or meeting a determined threshold (e.g. having two items in their shopping cart). The interruption allows the participant to be either redirected to another parallel user experience, or be prompted to agree to engage in a study or asked to answer a survey or the like.

Lastly, the study may include one or more events to occur in order to validate its successful completion. A task validator 547 tracks these metrics for study completion. Generally, task validation falls into three categories: 1) completion of a particular action (such as arriving at a particular URL, URL containing a particular keyword, or the like), 2) completing a task within a time threshold (such as finding a product that meets criteria within a particular time limit), and 3) by question. Questions may include any definition of success the study designer deems relevant. This may include a simple "were you successful in the task?" style question, or a more complex satisfaction question with multiple gradient answers, for example.

Figure 9:
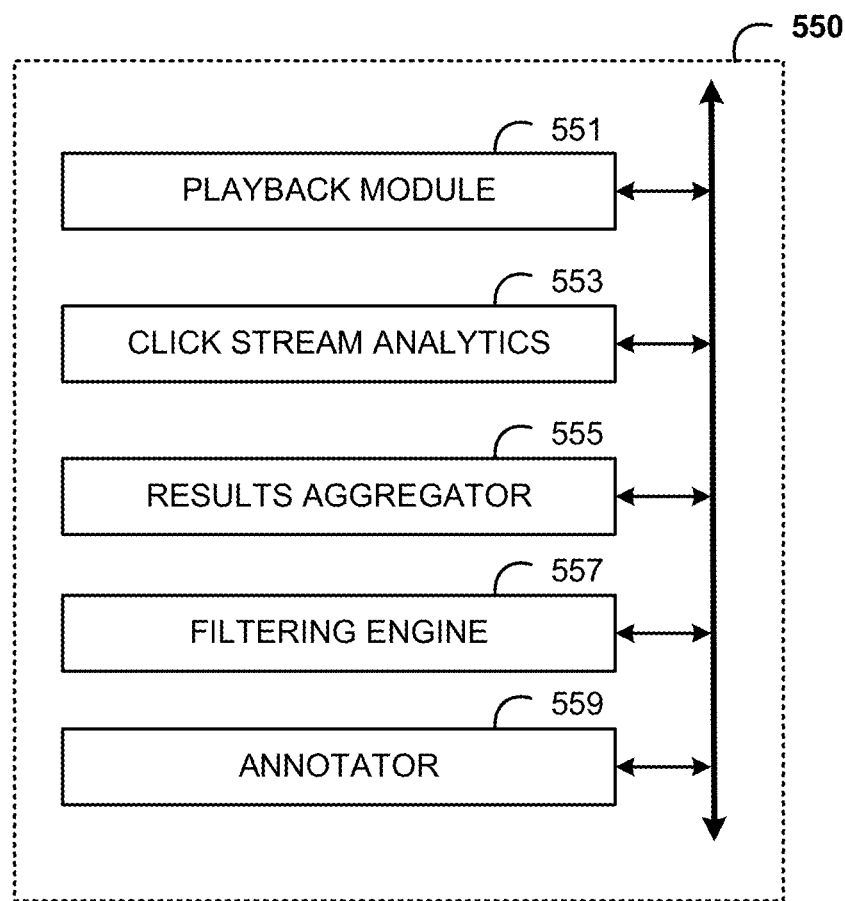
FIG. 9 is a logical diagram of the research module, in accordance with some embodiment.

Turning now to FIG. 9, the research module 550 is provided in greater detail. Compared to traditional user experience study platforms, the present systems and methods particularly excel at providing timely and accurate insights into a user's experience, due to these research tools. The research module includes basic functionalities, such as playback of any video or audio recordings by the playback module 551. This module, however, may also include a machine transcription of the audio, which is then time synchronized to the audio and/or video file. This allows a user to review and search the transcript (using keywords or the like) and immediately be taken to the relevant timing within the recording. And of the results may be annotated using an annotator 559 as well. This allows, for example the user to select a portion of the written transcription and provide an annotation relevant to the study results. The system then automatically can use the timing data to generate an edited video/audio clip associated with the annotation. If the user later searches the study results for the annotation, this auto-generated clip may be displayed for viewing.

In addition to the video and/or audio recordings, the clickstream for the participant is recorded and mapped out as a branched tree, by the click stream analyzer 553. This may be aggregated with other participants' results for the study, to provide the user an indication of what any specific participant does to complete the assigned task, or some aggregated group generally does. The results aggregator 555 likewise combines task validation findings into aggregate numbers for analysis.

All results may be searched and filtered by a filtering engine 557 based upon any delineator. For example, a user may desire to know what the pain points of a given task are, and thus filters the results only by participants that failed to complete the task. Trends in the clickstream for these individuals may illustrate common activities that result in failure to complete the task. For example, if the task is to find a laptop computer with a dedicated graphics card for under a set price, and the majority of people who fail to successfully complete this task end up stuck in computer components due to typing in a search for "graphics card" this may indicate that the search algorithm requires reworking to provide a wider set of categories of products, for example.

As noted above, the filtering may be by any known dimension (not simply success or failure events of a task). For example, during screening or as part of a survey attending the study, income levels, gender, education, age, shopping preferences, etc. may all be discovered. It is also possible that the participant pool includes some of this information in metadata associated with the participant as well. Any of this information may be used to drill down into the results filtering. For example it may be desired to filter for only participants over a certain age. If after a certain age success rates are found to drop off significantly, for example, it may be that the font sizing is too small, resulting in increased difficulty for people with deteriorating eyesight.

Likewise, any of the results may be subject to annotations. Annotations allow for different user reviewers to collectively aggregate insights that they develop by reviewing the results, and allow for filtering and searching for common events in the results.

All of the results activities are additionally ripe for machine learning analysis using deep learning. For example, the known demographic information may be fed into a recursive neural network (RNN) or convoluted neural network (CNN) to identify which features are predictive of a task being completed or not. Even more powerful is the ability for the clickstream to be fed as a feature set into the neural network to identify trends in click flow activity that are problematic or result in a decreased user experience.

Figure 10:
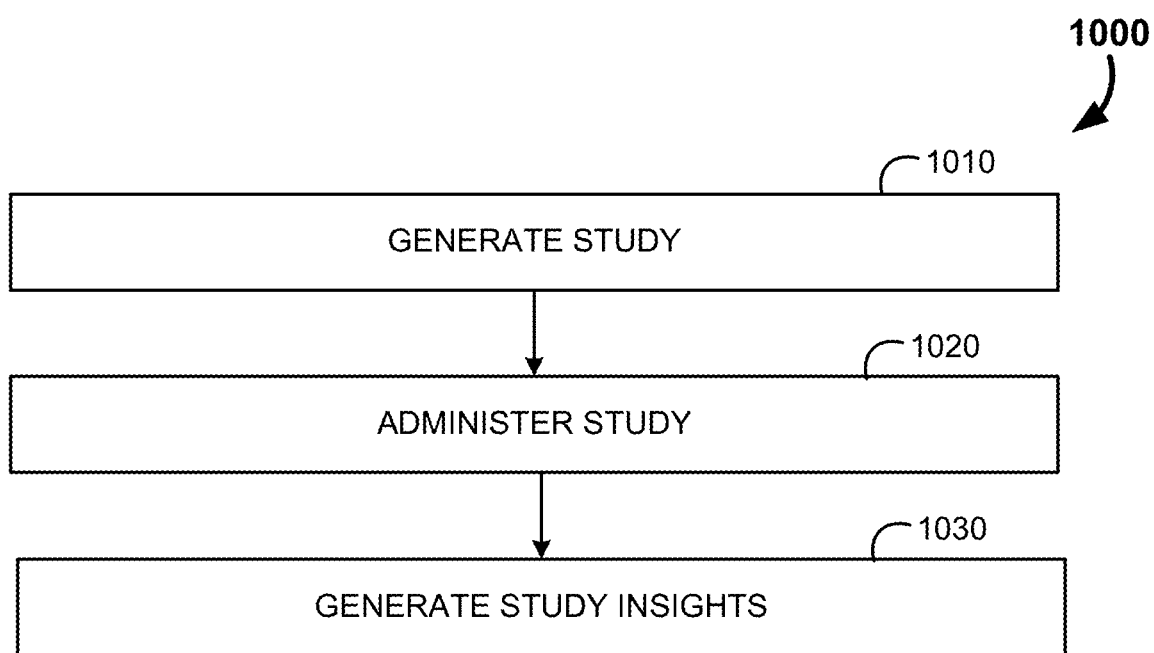
FIG. 10 is a flow diagram for an example process of user experience testing, in accordance with some embodiment.

Turning now to FIG. 10, a flow diagram of the process of user experience study testing is provided generally at 1000. At a high level this process includes three basic stages: the generation of the study (at 1010) the administration of the study (at 1020) and the generation of the study insights (at 1030). Earlier FIGS. 3A-C touched upon the study administration, and is intended to be considered one embodiment thereof.

Figure 11A:
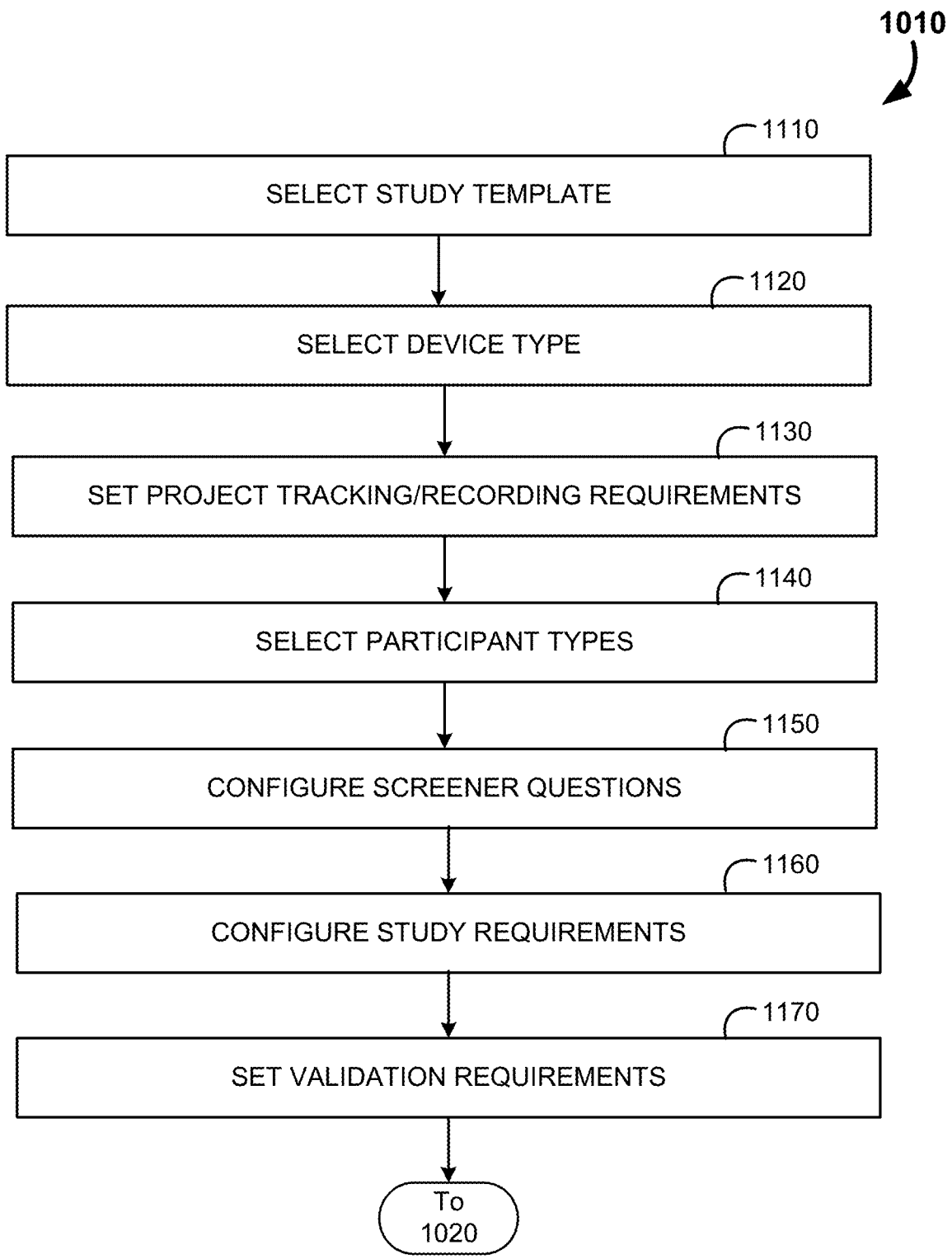
FIG. 11A is a flow diagram for the example process of study generation, in accordance with some embodiment.

FIG. 11A provides a more detailed flow diagram of the study generation 1010. As noted before, the present systems and methods allows for improved study generation by the usage of study templates which are selected (at 1110) based upon the device the study is to be implemented on, and the type of study that is being performed. Study templates may come in alternate languages as well, in some embodiments.

Study types generally include basic usability testing, surveys, card sort, tree test, click test, live intercept and advanced user insight research. The basic usability test includes audio and/or video recordings for a relatively small number of participants with feedback. A survey, on the other hand, leverages large participant numbers with branched survey questions. Surveys may also include randomization and double blind studies. Card sort, as discussed in great detail previously, includes open or closed card sorting studies. Tree tests assess the ease in which an item is found in a website menu by measuring where users expect to locate specific information. This includes uploading a tree menu and presenting the participant with a task to find some item within the menu. The time taken to find the item, and rate of successful versus unsuccessful queries into different areas of the tree menu are collected as results.

Click test measures first impressions and defines success areas on a static image as a heat map graph. In the click test the participant is presented with a static image (this may include a mock layout of a website/screenshot of the webpage, an advertising image, an array of images or any other static image) and is presented a text prompt. The text prompt may include questions such "Which image makes you the hungriest?" or "select the tab where you think deals on televisions are found." The location and time the user clicks on the static image is recorded for the generation of a heat map. Clicks that take longer (indicating a degree of uncertainty on behalf of the participant) are weighted as less strong, whereas immediate selection indicates that the reaction by the participant is surer. Over time the selections of various participants may be collected. Where many participants select an answer to a particular prompt in the same place relatively rapidly there is a darker heat map indicator. Where participants select various locations, the heat map will show a more diffuse result. Consistent location, but longer delay in the selection will also result in a concentration on the heat map, but of a lighter color, indicating the degree of insecurity by the participants.

Additionally, the user may be able to define regions on the static image that are considered 'answers' to the prompted question. This may allow for larger scale collection of success versus failure metrics, as well as enabling follow-up activities, such as a survey or additional click test, based upon where the participant clicks on the image.

Lastly, advanced research includes a combination of the other methodologies with logical conditions and task validation, and is the subject of much of the below discussions. Each of these study types includes separate saved template designs.

Device type is selected next (at 1120). As noted before, mobile applications enable SDK integration for user experience interruption, when this study type is desired. Additionally, the device type is important for determining recording ability/camera capability (e.g., a mobile device will have a forward and reverse camera, whereas a laptop is likely to only have a single recording camera, whereas a desktop is not guaranteed to have any recording device) and the display type that is particularly well suited for the given device due to screen size constraints and the like.

The study tracking and recording requirements are likewise set (at 1130). Further, the participant types are selected (at 1140). The selection of participants may include a selection by the user to use their own participants, or rely upon the study system for providing qualifies participants. If the study system is providing the participants, a set of screener questions are generated (at 1150). These screener questions may be saved for later usage as a screener profile. The core participants and larger general panel participants may be screened until the study quota is filled.

Figure 11B:
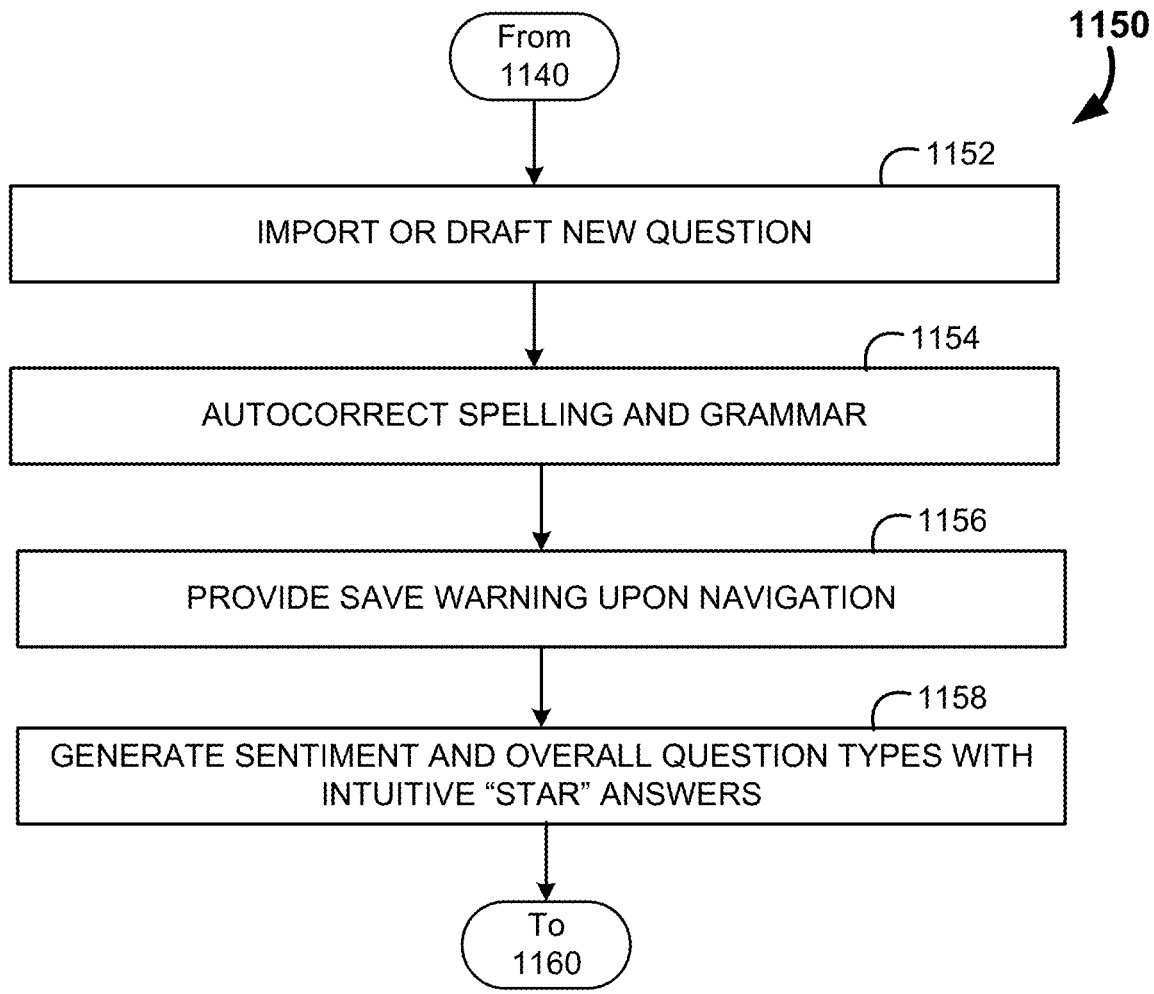
FIG. 11B is a flow diagram for the example process of screener question configuration, in accordance with some embodiment.

FIG. 11B provides a more detailed flow diagram of the screener question configuration process. This includes either the importing of an already generated question, or the user deciding to draft a new question (at 1152). An auto-correction for spelling and grammar is applied to the questions as written (at 1154). Spelling auto-correct prevents unintentional errors from entering the study. Such errors are costly to correct as they require user time and may negatively impact the participant's view of the study (possibly shifting sentiment resulting in skewed performance results unrelated to the actual user experience that is being examined).

The system, additionally, provides the user a warning if they attempt to navigate away from the study questions prior to saving them (at 1156). This prevents recent, non-saved question changes from being lost/discarded. The screener questions also allow for the inclusion of sentiment and overall experience rating questions with intuitive "star" based answers (at 1158). People are familiar with assigning 'stars' to indicate their general level of enjoyment or satisfaction. These rating systems are typically on a 1-5 star level, with more 'stars' equating to a better experience. For example, the Ritz Carlton generally has a very high star rating on hotel review sites, whereas a Motel 8 generally has a lower star rating.

After the screener questions are generated, the process returns to FIG. 11A, where the study requirements are set (at 1160). Study requirements may differ based upon the study type that was previously selected. For example, the study questions are set for a survey style study, or advanced research study. In basic usability studies and research studies the task may likewise be defined for the participants. For tree tests the information being sought is defined and the menu uploaded. For click test the static image is selected for usage. As noted before, the study questions can also include overall sentiment "star" type questions as well. Lastly, the success validation is set (at 1170) for the advanced research study.

Figure 12:
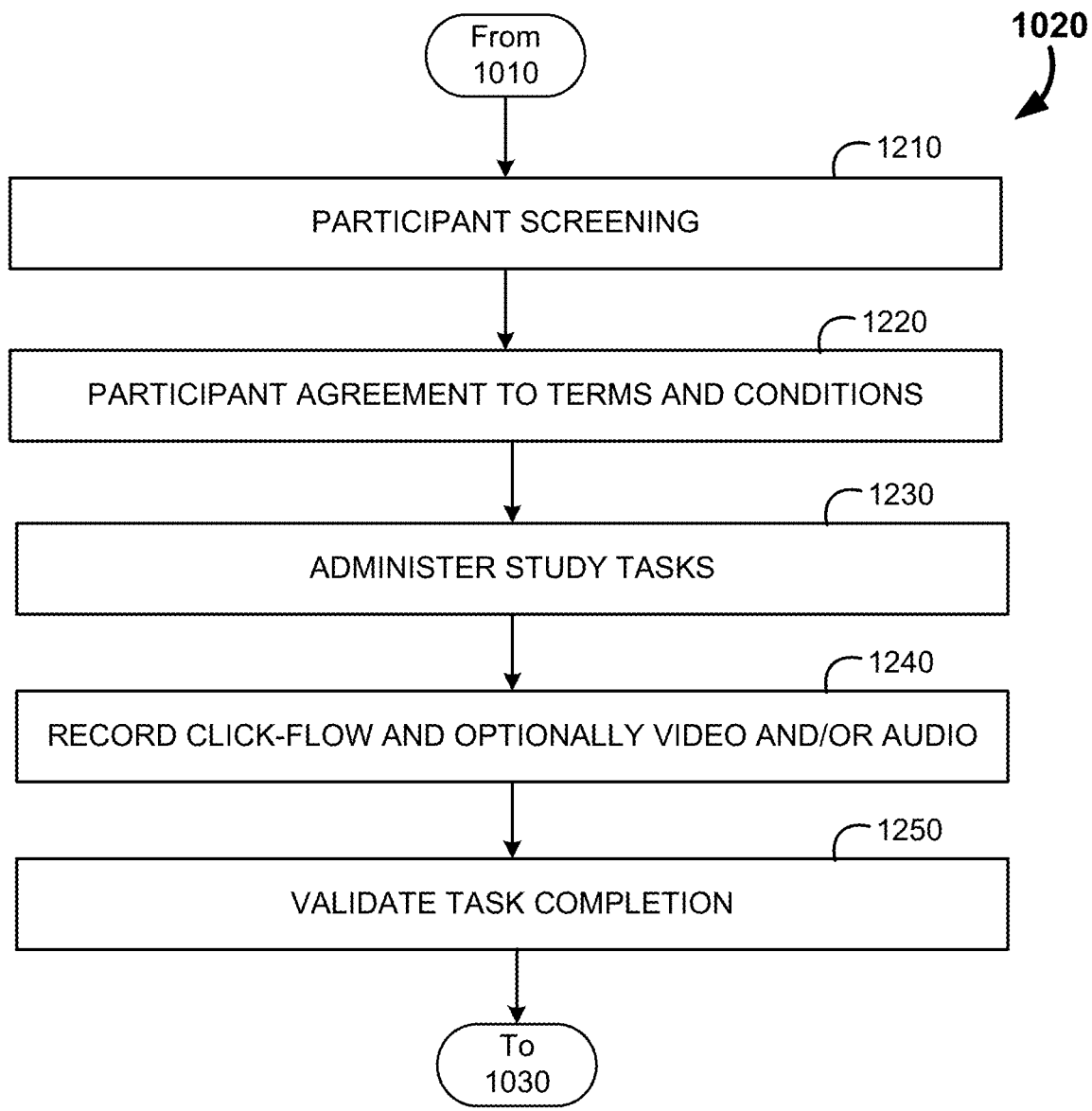
FIG. 12 is a flow diagram for the example process of study administration, in accordance with some embodiment.

After study generation, the study may be implemented, as shown in greater detail at 1020 of FIG. 12. Study implementation begins with screening of the participants (at 1210). This includes initially filtering all possible participants by known demographic or personal information to determine potentially eligible individuals. For example, basic demographic data such as age range, household income and gender may be known for all participants. Additional demographic data such as education level, political affiliation, geography, race, languages spoken, social network connections, etc. may be compiled over time and incorporated into embodiments, when desired. The screener profile may provide basic threshold requirements for these known demographics, allowing the system to immediately remove ineligible participants from the study. The remaining participants may be provided access to the study, or preferentially invited to the study, based upon participant workload, past performance, and study quota numbers. For example, a limited number (less than 30 participants) video recorded study that takes a long time (greater than 20 minutes) may be provided out on an invitation basis to only core panel participants with proven histories of engaging in these kinds of studies. In contrast, a large survey requiring a thousand participants that is expected to only take a few minutes may be offered to all eligible participants.

The initially eligible participants are then presented with the screener questions. This two-phased approach to participant screening ensures that participants are not presented with studies they would never be eligible for based upon their basic demographic data (reducing participant fatigue and frustration), but still enables the user to configure the studies to target a particular participant based upon very specific criteria (e.g., purchasing baby products in the past week for example).

After participants have been screened and are determined to still meet the study requirements, they are asked to accept the study terms and conditions (at 1220). As noted before, privacy regulations play an ever increasing role in online activity, particularly if the individual is being video recorded. Consent to such recordings is necessitated by these regulations, as well as being generally a best practice.

After conditions of the study are accepted, the participant may be presented with the study task (at 1230) which, again, depends directly upon the study type. This may include navigating a menu, finding a specific item, locating a URL, answering survey questions, providing an audio feedback, card sorting, clicking on a static image, or some combination thereof. Depending upon the tasks involved, the clickstream and optionally audio and/or video information may be recorded (at 1240). The task completion is likewise validated (at 1250) if the success criteria is met for the study. This may include task completion in a particular time, locating a specific URL, answering a question, or a combination thereof.

Figure 13A:
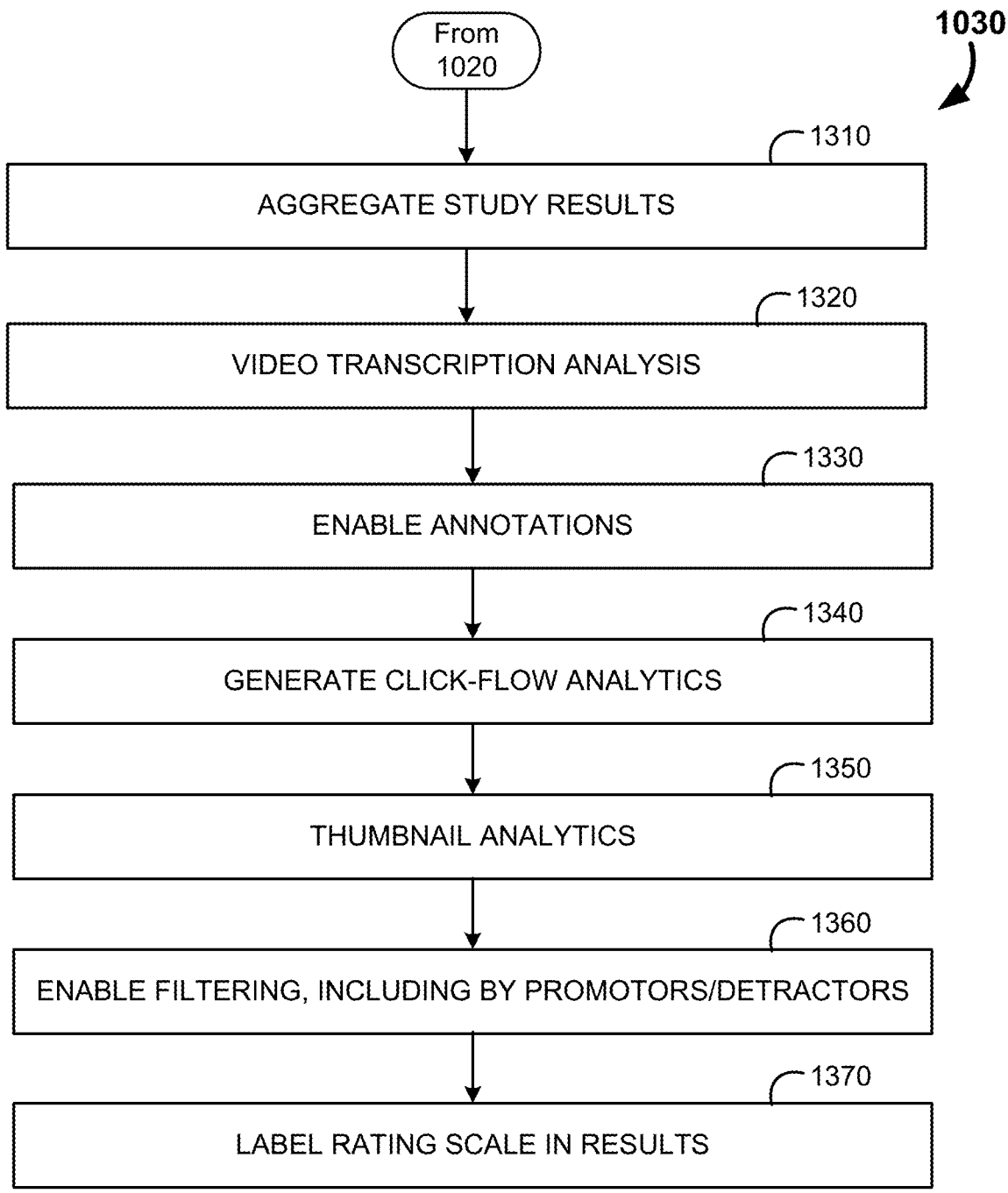
FIG. 13A is a flow diagram for the example process of insight generation, in accordance with some embodiment.

After study administration across the participant quota, insights are generated for the study based upon the results, as seen at 1030 of FIG. 13A. Initially the study results are aggregated (at 1310). This includes graphing the number of studies that were successful, unsuccessful and those that were abandoned prior to completion. Confidence intervals may be calculated for these graphs. Similarly, survey question results may be aggregated and graphed. Clickstream data may be aggregated and the likelihood of any particular path may be presented in a branched graphical structure. Aggregation may include the totality of all results, and may be delineated by any dimension of the study.

Figure 13B:
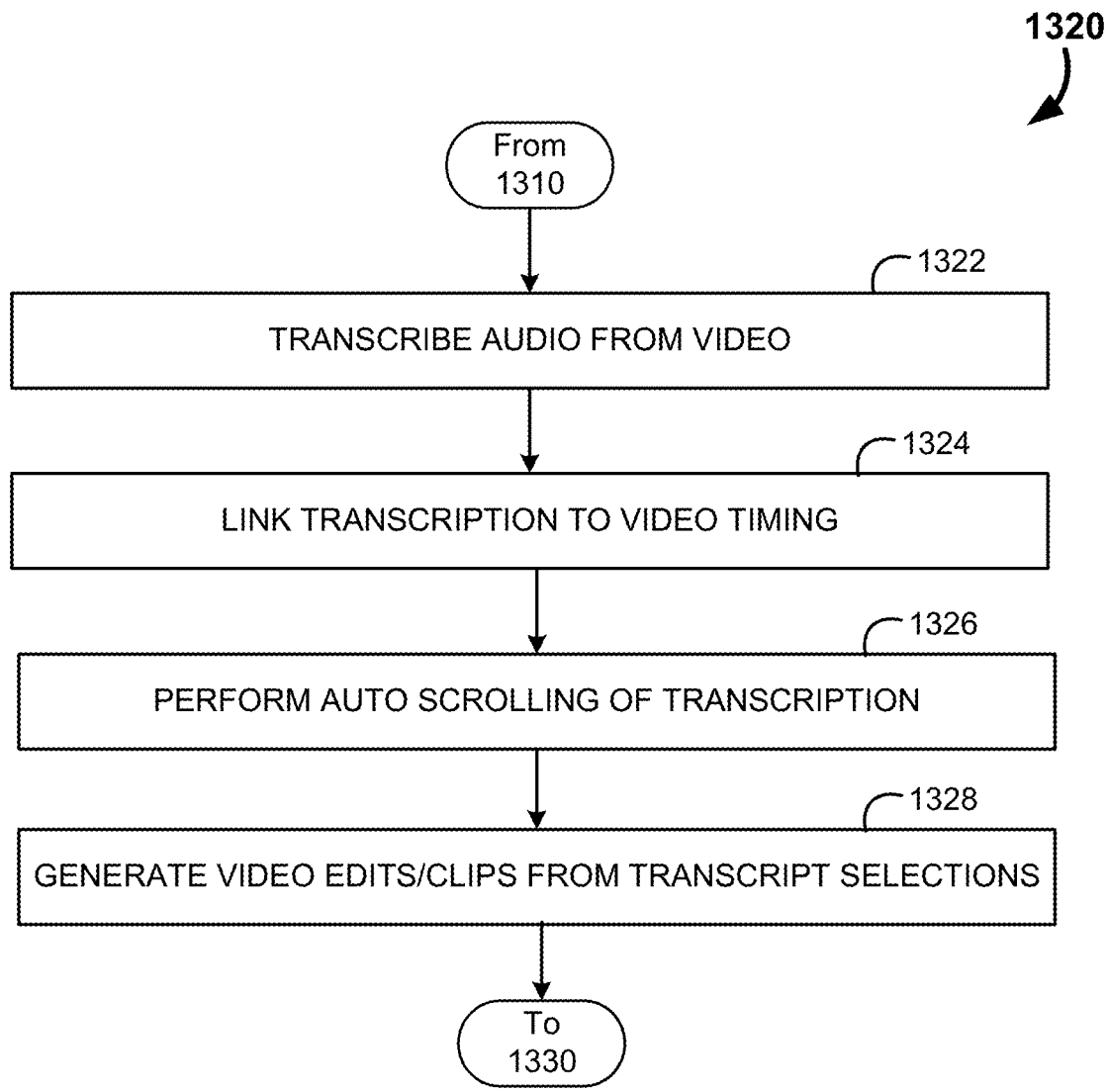
FIG. 13B is a flow diagram for the example process of video transcription analysis, in accordance with some embodiment.

When an audio or video recording has been collected for the study, these recordings may be transcribed using machine voice to text technology (at 1320). FIG. 13B provides a more detailed flow diagram of this transcription analysis of video recordings. Initially the audio component of the recording is isolated and fed through speech recognition software to generate a text string (at 1322). The resulting text is time linked to the video (at 1324). This allows for the text to automatically scroll as the video plays (at 1326), and also allows the video to skip to the point of a text selection by the user. For example, when a portion of the transcription is searched, the recording will be set to the corresponding frames. This allows for easy review of the recording, and allows for automatic clip generation by selecting portions of the transcription to highlight. These clips of text can be appended together to generate video edits or clips of the sections of interest (at 1328). Transcription also enables searching of the audio recordings by keywords.

Returning to FIG. 13A, after video transcription analysis, the results can be tagged/annotated (at 1330). The corresponding written responses, video or audio clip is automatically edited that corresponds to this tag for easy retrieval. The clip can likewise be shared by a public URL for wider dissemination. Any portion of the results, such as survey results and clickstream graphs, may similarly be annotated for simplified review.

As noted, clickstream data is analyzed (at 1340). This may include the rendering of the clickstream graphical interface showing what various participants did at each stage of their task. As noted before, deep learning neural networks may consume these graphs to identify 'points of confusion' which are transition points that are predictive of a failed outcome.

All the results are filterable (at 1350) allowing for complex analysis across any study dimension. Here too, machine learning analysis may be employed, with every dimension of the study being a feature, to identify what elements (or combination thereof) are predictive of a particular outcome. One particularly useful filtering dimension is based upon promotor status versus detractor status. This information may be employed to improve the design of subsequent website designs, menus, search results, and the like.

Although not illustrated, video recording also enables additional analysis not previously available, such as eye movement tracking and image analysis techniques. For example, a number of facial recognition tools are available for emotion detection. Key emotions such as anger, frustration, excitement and contentment may be particularly helpful in determining the user's experience. A user who exhibits frustration with a task, yet still completes the study task may warrant review despite the successful completion. Results of these advanced machine learning techniques may be automatically annotated into the recording for search by a user during analysis.

While the above discussion has been focused upon testing the user experience in a website for data generation, it is also possible that these systems and methods are proactively deployed defensively against competitors who are themselves engaging in user experience analysis. This includes first identifying when a user experience test is being performed, and taking some reaction accordingly. Red-flag behaviors, such as redirection to the client's webpage from a competitive user experience analytics firm is one clear behavior. Others could include a pattern of unusual activity, such as a sudden increase in a very discrete activity for a short duration.

Once it is determined that a client's website has been targeted for some sort of user experience test, the event is logged. At a minimum this sort of information if helpful to the client in planning their own user experience tests, and understanding what their competitors are doing. However, in more extreme situations, alternate web portals may be employed to obfuscate the analysis being performed.

Figure 14:
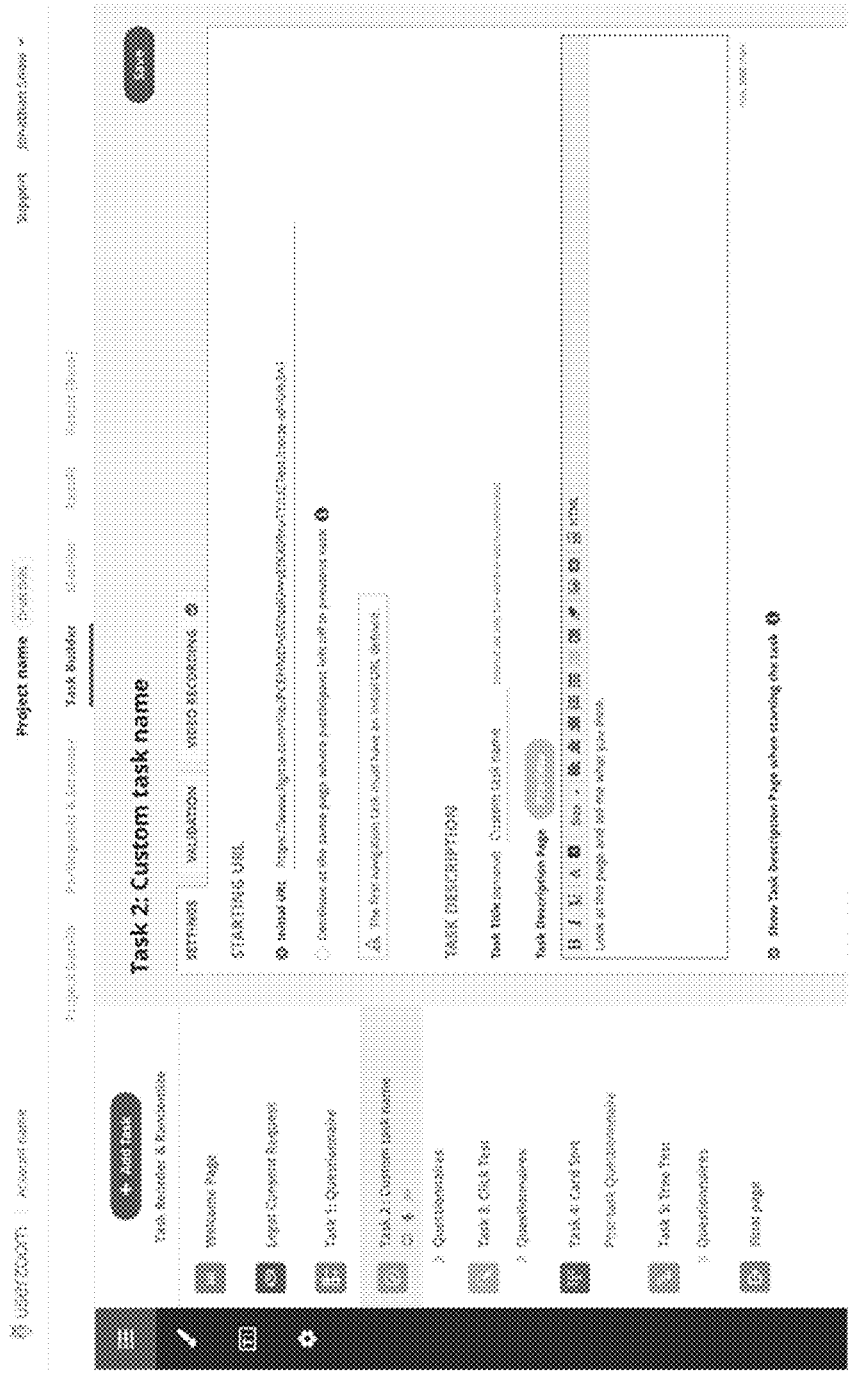

Turning now to FIGS. 14, 15, 16A, 16B, 17-26, 27A-H and 28, example screenshots of the operation of the user experience study system are provided. Particularly at FIG. 14, an example illustration of a task generation interface is illustrated at 1400. On the leftmost side of the screen is a navigational bar that utilizes easily understood iconography to allow the user to open a main menu, check and modify settings, and the like. Adjacent to these basic navigational options is a listing of all tasks associated with the given project. These tasks almost always include a welcome message, a legal consent, a series of questions and/or other task activities, and a final message/page. The user is able to reorder or randomize the order of particular tasks utilizing this menu, or may initiate an additional task. The user may also select any task already created in order to update the task, or review the task criteria.

Further to the right, the task details are provided. In this example, the task includes a starting URL page, a task name, task description, and detailed criteria of the task content. In the case of a questionnaire, for example, this would include a question and a number of possible answers. In the case of another task, such as a navigation assignment, the user includes a task instruction that is displayed to the participant, and one or more completion criteria, for example.

Figure 15:
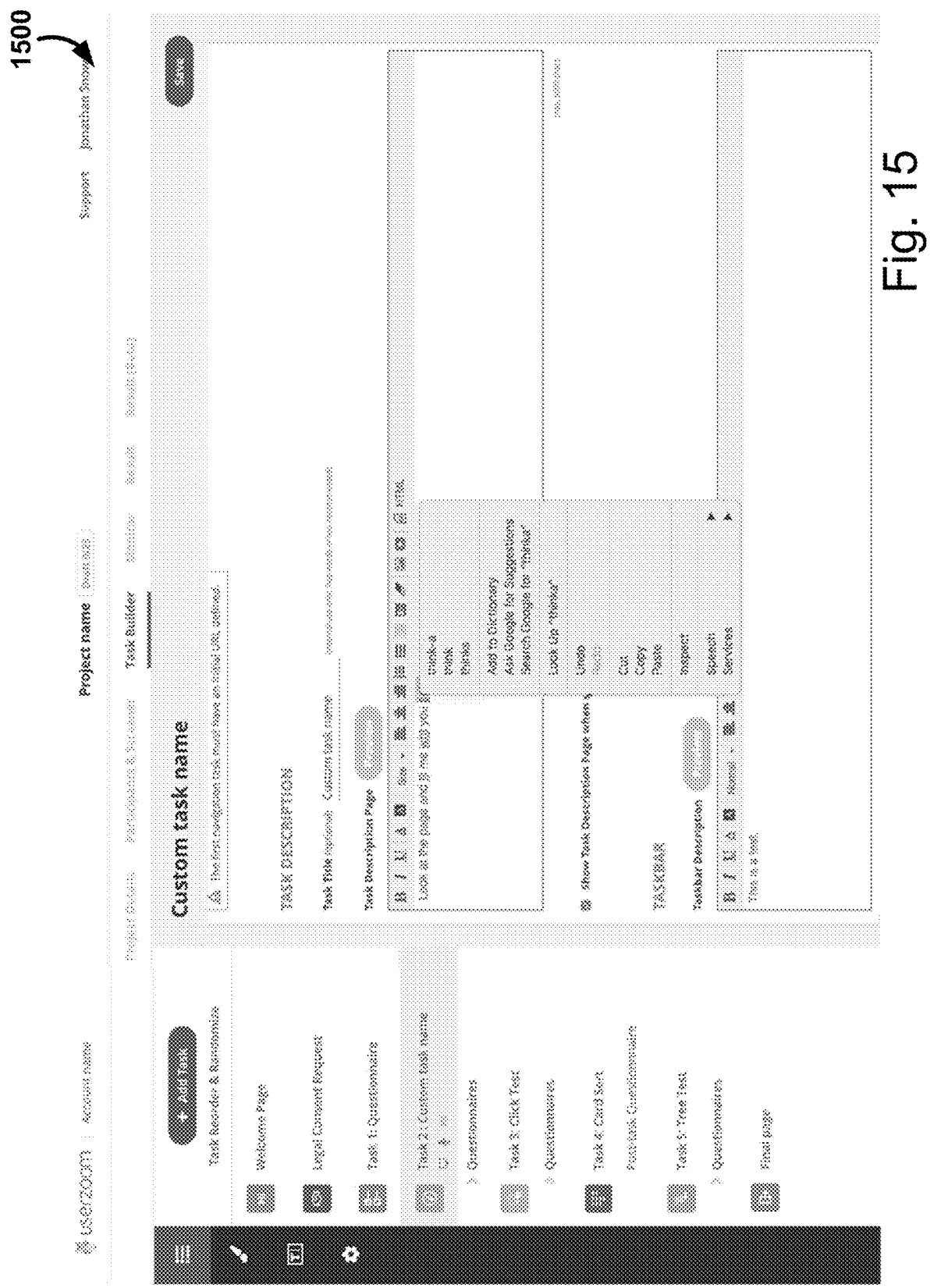

Turning now to FIG. 15, the same project task interface screenshot 1500 is provided, where the user has started entering text into the task description field. In this example, the user has misspelled a word, resulting in a spelling checker functionality to enable automatic checking and correction of any misspelled words or incorrect grammar. Although seemingly trivial, spelling correction can have a significant impact upon project success. Incorrect spelling is costly, in terms of time, to go back and correct. More importantly, however, is that participant answers may be impacted by incorrect spelling/grammar in a manner that jeopardizes the study veracity. For example, a participant that is presented with misspelled words may have difficulty completing the task, or may have a lower baseline confidence in the underlying website as a result.

Another frequent cause of difficulty and lost productivity, on the part of the user, is the failure to save changes made to a given task. In order to prevent such an occurrence, the system may automatically save the changes made, or provide an alert message to the user when they navigate away from a page that has been edited but not yet saved. This prevents inadvertent loss of work product.

Figure 16A:
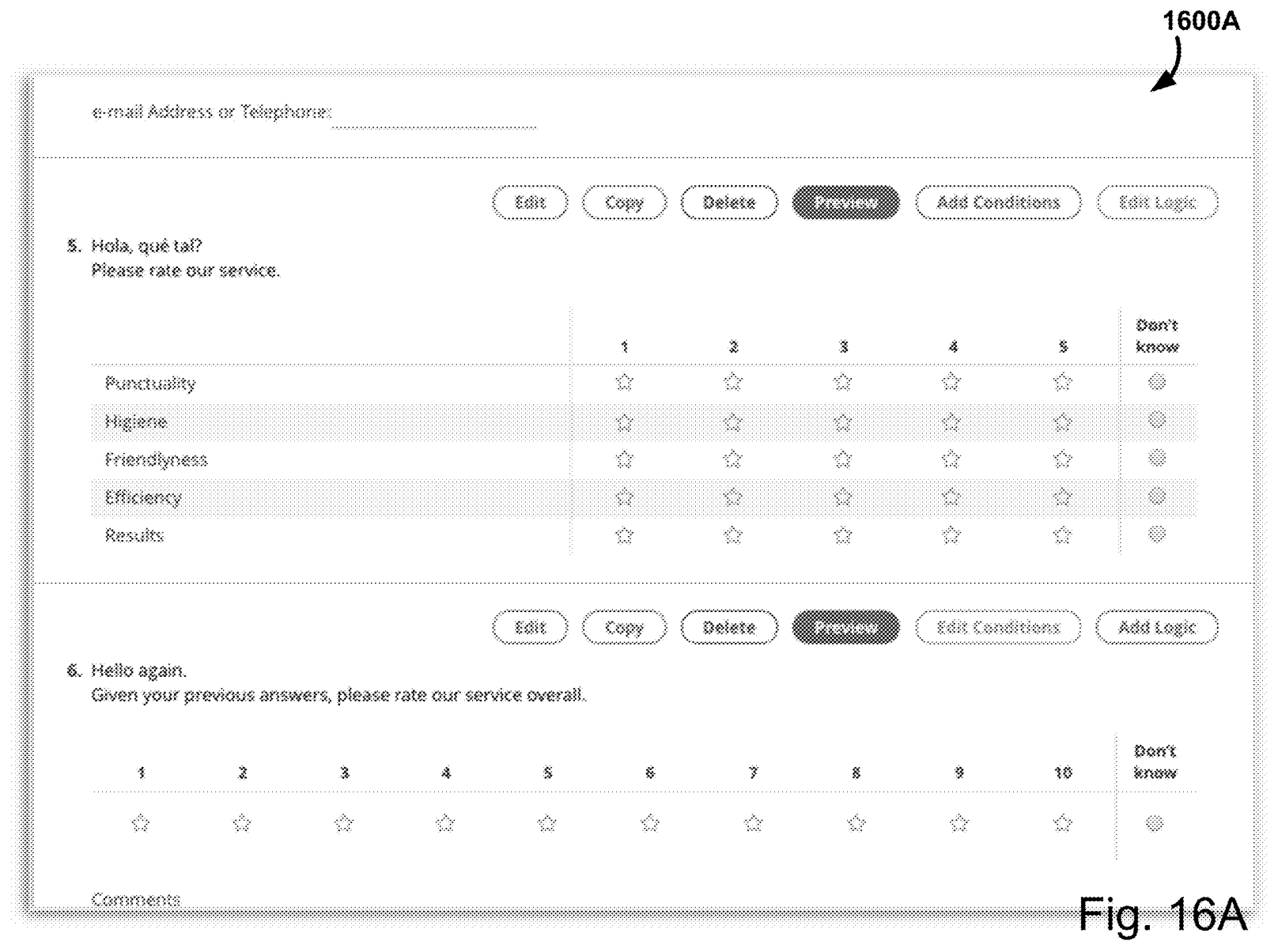

Turning now to FIG. 16A, a preview interface 1600A for a set of questions is provided. In this example interface, the user has designed a series of questions relating the participant's sentiment regarding various aspects of the service provided. This is provided in the readily understood "star" rating schema. In this example, the sentiment scoring is performed on a five star scale, and an overall question is also provided on a more granular ten star scaling.

Figure 16B:
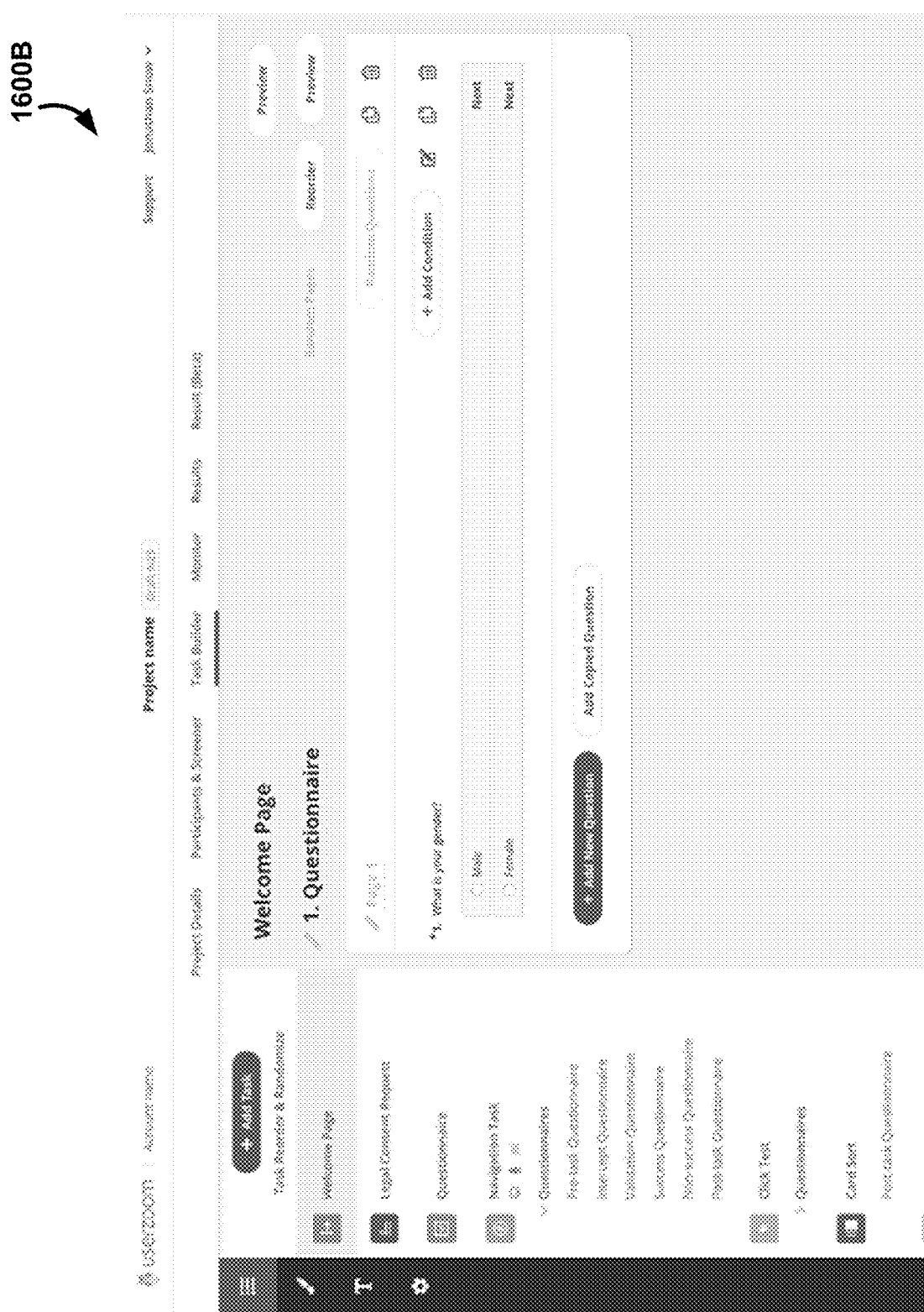

FIG. 16B is another example interface 1600B of the welcome page questionnaire being generated by the user. In this example, the user is querying the participant to provide demographic information such as gender. Like the tasks themselves, the order of the questions within a task may be reordered as desired, or randomized in order to avoid injecting study 'noise' due to question order. For example, a question about household income directly before asking about the propensity to purchase an item may skew results of the subsequent question. By randomizing questions, such effects can be minimized.

Importantly, in this questionnaire, the system additionally illustrates the logic associated with the various answers to the right of the answer. This is only presented to the user to assist in the generation of screener questions and/or tasks. The participant is not shown the underlying logic. In this example, the participant's gender is queried. Either answer is acceptable and progresses the participant to the 'next' task. In some situations however, the study may wish to screen out individuals because only some target audiences are being studied. For example, it is known that the vast majority of married household purchase decisions are made by women. For a website targeting this kind of household, it may be desirable to screen out male participants. The logic in such an instance may indicate that the answer "male" is 'screened' as a result.

In yet other situations, answers may route the participants differently. For example, a participant indicating they have an income below a certain threshold may be asked to find one class of products on a website, whereas people above the income threshold may be requested to find an alternate product. This may result in a 'skip to task X' style logic being listed next to the corresponding answers.

Figure 17:
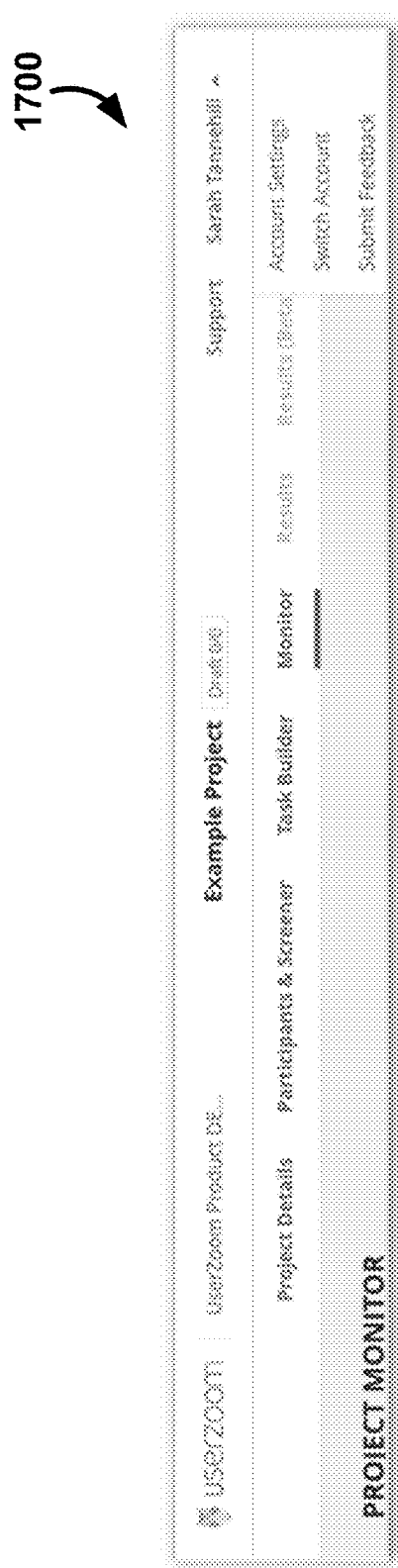

Moving on, FIG. 17 illustrates the top navigation bar 1700 of the interface dashboard. Thus far the focus has been on the task builder components, but additional tabs enable the user to quickly navigate to other focuses of the given project. Project details, for example, provides and overview of the project: tasks involved, participant numbers, dates of creation and administration, and the like. Participants and screener, on the other hand, is an interface whereby the user is able to designate what the participant eligibility for the given project should be. This includes setting participant filters (e.g., setting thresholds on household income, participant age, percentage of each gender, etc.) as well as customized eligibility questions (e.g., 'are you planning on purchasing a major appliance in the next 6 months?', 'do you have a dog in your household?' etc.).

The task building tab has already been illustrated in a fair degree of detail. This tab allows the user to access the individual tasks involved in the project, and edit, delete, or generate additional tasks as desired. The monitor tab, allows the user to rapidly and easily review the progress on an ongoing project, in real time. This provides metrics related to the study duration, the number of participants that have completed the project, participant count attempting the project, remaining participants/duration before project termination (if applicable), and the like. The results tab allows the user to review the results collected from participant activity, both in real time for ongoing projects, or in a more finalized aggregate after full project completion.

Figure 18:
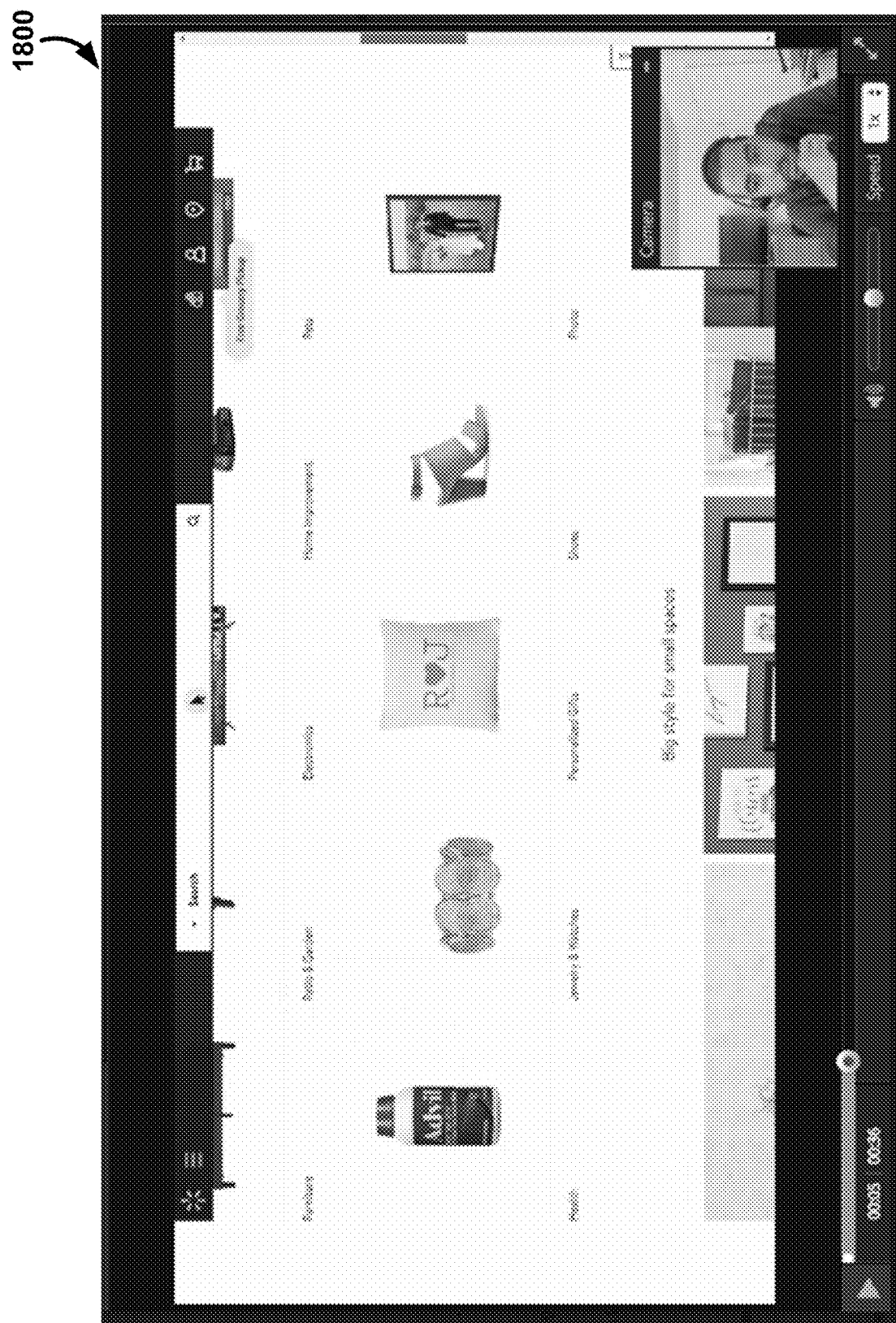

Turning now to FIG. 18, an example screenshot 1800 of a recording of a user experience study is provided. In this example, the user has been provided a website for the retailer, and has been instructed to complete a task. This could include adding a particular product to their shopping cart, finding a particular deal/coupon, navigating to a specific page, or finding a class of goods or services. The progress of the user's activity has been recorded, including an audio and video recording of the participant himself. The user, when reviewing, is provided the video feed in the corner so that the user's body language, emotion, and facial features can be viewed concurrently with the activity they are performing on the website. For example, if the participant stops moving the cursor, the user would be interested if this is due to confusion (an opportunity to alter the website design to be more intuitive), or due to a distraction on the part of the participant. Likewise, certain activities, such as payment authentication or applying promotional coupons, often involve a tradeoff between convenience and security. Being able to monitor a participants expressions of frustration or boredom in real time with these activities can provide valuable insights to the user on what is the 'correct' level of inconvenience/security that won't dissuade a potential customer, yet achieves the retailer's fraud protection goals.

Figure 19:
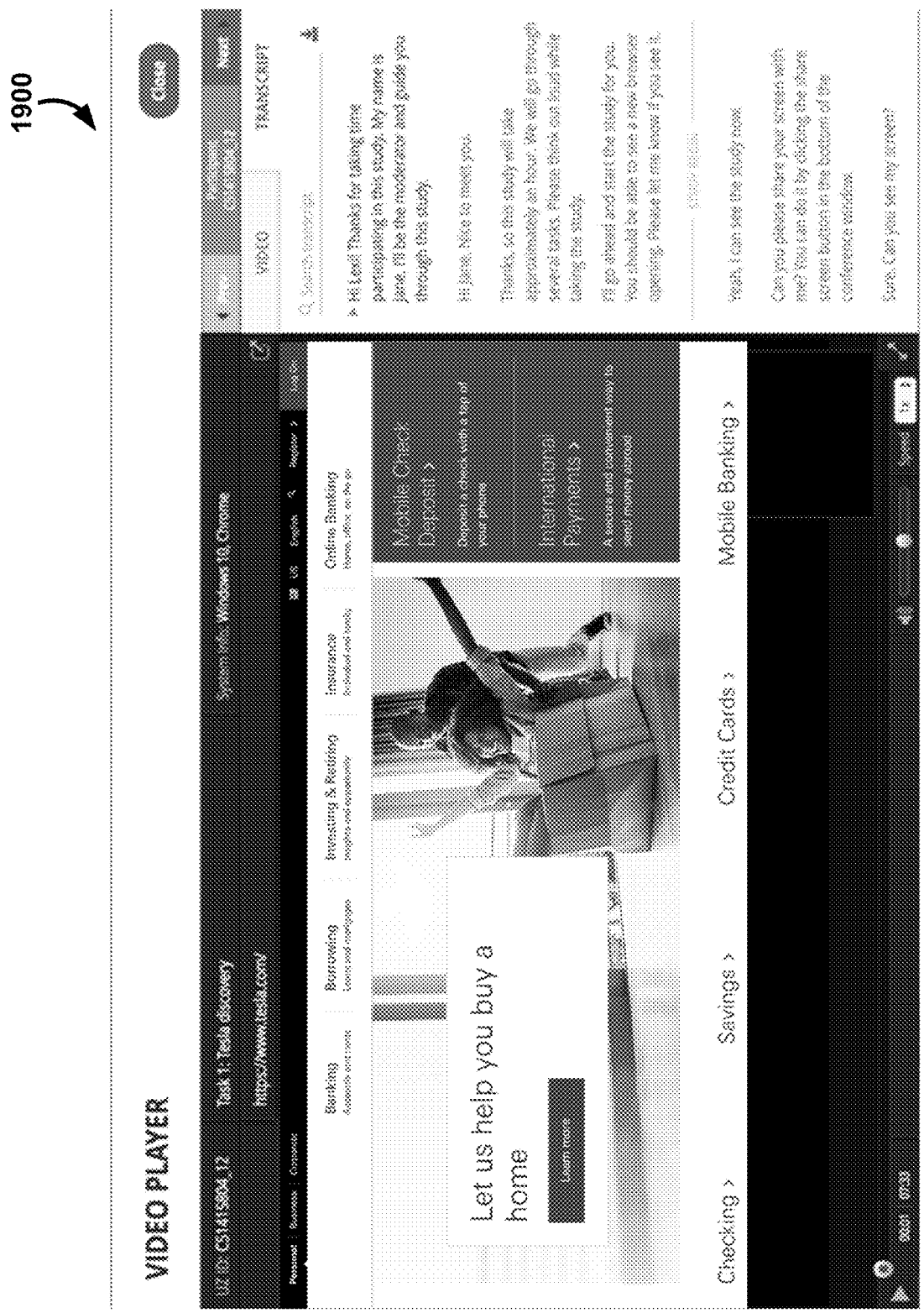

FIG. 19, in contrast, provides an example screenshot 1900 of the recorded session playback with the video transcription automatically scrolling alongside the participant's screen capture. As the recording progresses, the transcription on the rightmost side automatically scrolls in time. If the user selects a portion of the transcription, the recording will automatically advance to the timing of the selected transcription. Likewise, the user is able to select, and cut out portions of the transcribed text to automatically edit out a corresponding video clip. These clips can be stitched together to generate curated video segments of particular matter the user determines to be particularly helpful. Transcriptions also allow for searching of the video for terms, resulting is an approximate twofold increase in efficiency in analyzing videos as compared to before transcription was made possible.

Figure 20:

Turning now to FIG. 20, a first example chart 2000 for aggregated results of the completed project is illustrated. This chart plots the results from participants that were asked to rank their interest in a website's capability. In this example, accessibility is determined to be of greatest interest to the participant population, followed by inclusivity and then usability. The chart is illustrated as a descending ordered horizontal histogram, but controls on the top of the results interface allow other chart formats (vertical bar, pie, etc.) and changes to results ordering (native, ascending, descending). When applicable the results may also be represented in terms of counts, percentages, or both. The chart grid may likewise be altered based upon user preference. Any such chart may be exported for report generation, or for display outside of the user experience study system.

Figure 21:
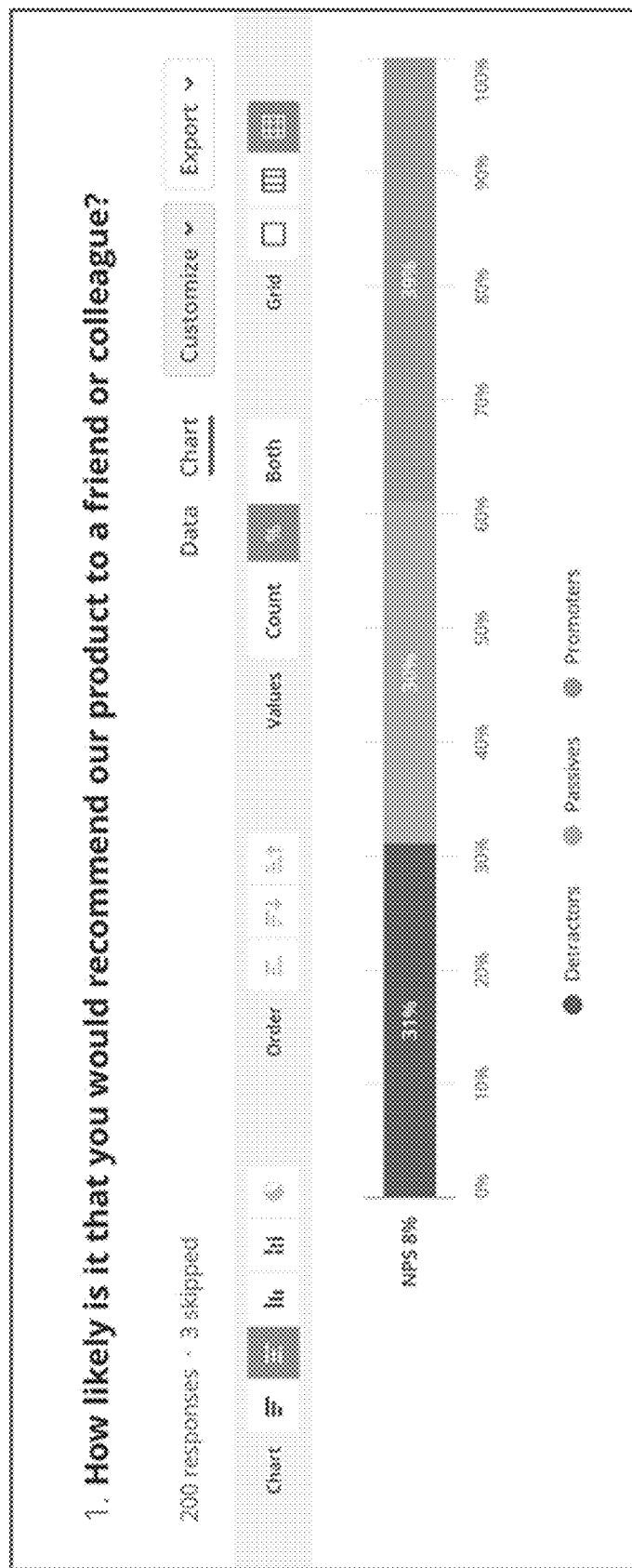

FIG. 21 provides a second example chart 2100 for the aggregated results of the project, this time directed to the question of whether the product being surveyed would be recommended to a friend by the participant. This generally is known as a "promotor" question. The participant may, for example, be provided a ten point chart, where values 1-3 are considered 'detractors', 4-7 are 'passive' and only 9 and 10 are considered 'promoters'. The degree to which promoters are greater percentage than detractors is a fairly reliable and simple metric in determining the usability of a website, or the market success of a product. For example, assume two products are reviewed, and the first ranks 35% detractors, 30% passive, and 45% promoters; whereas the second is ranked 25% detractors, 50% passive and 25% promoters. One might think that the item with fewer detractors (item two) would be more successful, but empirically the product with the larger difference between promoters and detractors (item one) will be more successful in the marketplace. This is known as a 'net promotor score', and involves taking the difference between the promoters and detractors and the resulting percentage differential is a predictor of success.

This type of graph provides a clear view to any user of the general breakdown of promoter versus detractors. This graph is selected to be in total value horizontal bars as a percentage. Of course, this could be represented otherwise (e.g., as a histogram, pie chart, in terms of raw count, etc.) if the user were to alter the chart configurations, as discussed in the prior figure.

Figure 22:
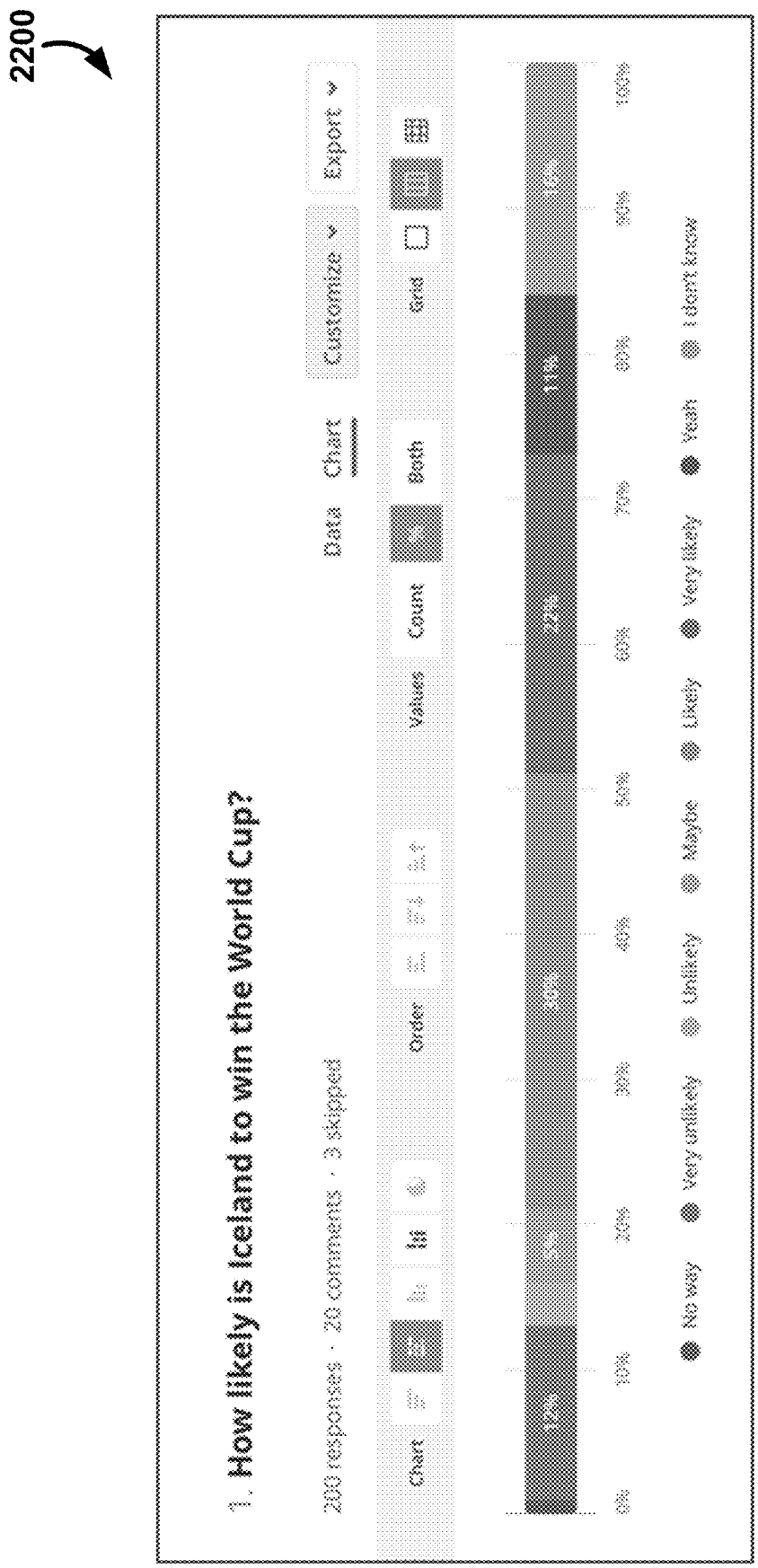

FIG. 22 provides yet a third example chart 2200 for an aggregated survey question result from the project. This question was related to the likelihood of a particular country's team winning the championship game. The question answers that were used in the question task are mapped to the legend of the chart automatically, in order to make the results chart easily readable by the user during interpretation. Like the previous figure, this chart is provided in terms of a horizontal percentage graph, but could be represented differently by user preference.

Turning now to FIG. 23, a close-up of an example transcription pane 2300 is provided. As seen at the top, the user is capable of inputting a search term (here "study") which is then highlighted throughout the transcription. In this example transcription the term is present twenty times. The user may jump to the next instance of the term by selecting the down arrow, or may manually scroll through the transcription to find the highlighted term. Again, empirically this functionality doubles the efficiency of analyzing video results of a study.

Transcriptions are dependent upon audio quality of the recording, accent of the speaker, and are generally available within twice the length of the recording (so a 5 minute recording would be transcribed within ten minutes). In some cases, due to audio quality features, and accents, various voice-to-transcription software models may be employed. The specific transcription model may be selected based upon parallel operation of the models, and selection of a model with the highest confidence, or via cross referencing the demographic information with the model characteristics. For example, a particular model may operate better with native Spanish speaking individuals who are speaking in English. If the participant indicates on his questionnaire that he is from Spain, for example, this model may be provided preference when transcription occurs.

In FIG. 24, the same example transcription pane is provided, this time with the user selecting a portion of the text for further action, at 2400. The selected text can be merely copied, marked or annotated for easy retrieval, or automatically used to generate a video clip timed to the transcription. In some example embodiments, the clip generated for the selected text will be longer than the actual audio portion selected. A clip that starts exactly as the participant starts talking may be abrupt, and not a 'natural' edit. Instead the system may determine the length of time prior to the selected words in the transcript that the immediate prior words ended. This pause duration may then be compared against a threshold pause, and the sorter of the two may be utilized as an initial video length addition. In some embodiments this threshold is between 200 ms to 3 seconds. Generally a one second threshold is sufficient however. A similar analysis may take place after the selected transcript text. For this example, the moderator "Jane" is the person speaking in the highlighted transcript. The participant "Lexi", immediately prior to the selected transcript portion has states "Nice to meet you." Assume that these is a pause between speakers of 800 ms, a relatively natural cadence for speaking over an internet connection. Breaks in speech and pause cadence vary based upon communication medium (in person is generally faster than over a 'slow' computer connection for example) and by culture (Americans tend to speak with shorter pauses between sentences than the Chinese for example). The delay threshold can likewise be modulated accordingly. For example, given that this is an American participant, the threshold may be set at half a second in this example.

After the highlighted portion in this example figure, Jane pauses between the sentences before continuing to speak. In this example this pause is relatively short, on the order of 200 ms, due to the fact the same person is still speaking. When the user selects "create clip" the system compares the time between Lexi saying "you" and the first word of the highlighted portion "Thanks". Again this is 800 ms in this example, which is greater than the 500 ms threshold. The shorter length (500 ms) is thus used. On the backend, however, the delay between the word "hour" and "We" is merely 200 ms, which is less than the threshold length of 500 ms. Thus the actual clip timing would extend from 500 ms before the selected words are spoken to 200 ms after. This provides a very "organic" clip that is not abrupt, and does not start or end in the middle of someone speaking.

All of this is dependent upon sequential speech, which is not always the case in a real world application. When two people are speaking at the same time, for example, the system may generate a clip based upon the threshold delays when there is no pause between speakers (or a very minimal pause of less than 10-50 ms).

Figure 25:
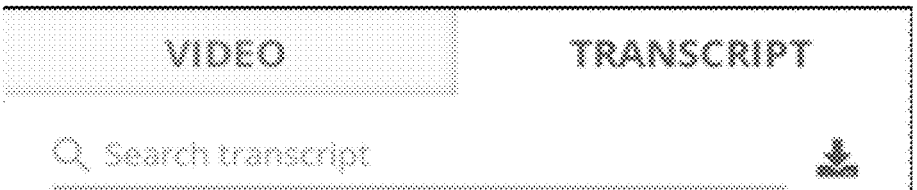

Turning now to FIG. 25, the same example transcription pane is provided, this time with the user scrolling manually through the transcript while the recording is still playing, at 2500. The user for example may wish to review another section as something else is going on in the recording. If the user desires, she may select a part of the transcript to automatically jump to that part of the recording, or may simply scroll through the transcript as the recording progresses at its natural pace. At any time, the user may select the 'resume transcript auto-scroll' button at the bottom of the screen to resynchronize the text presented in the transcript to the recording timing.

Figure 26:
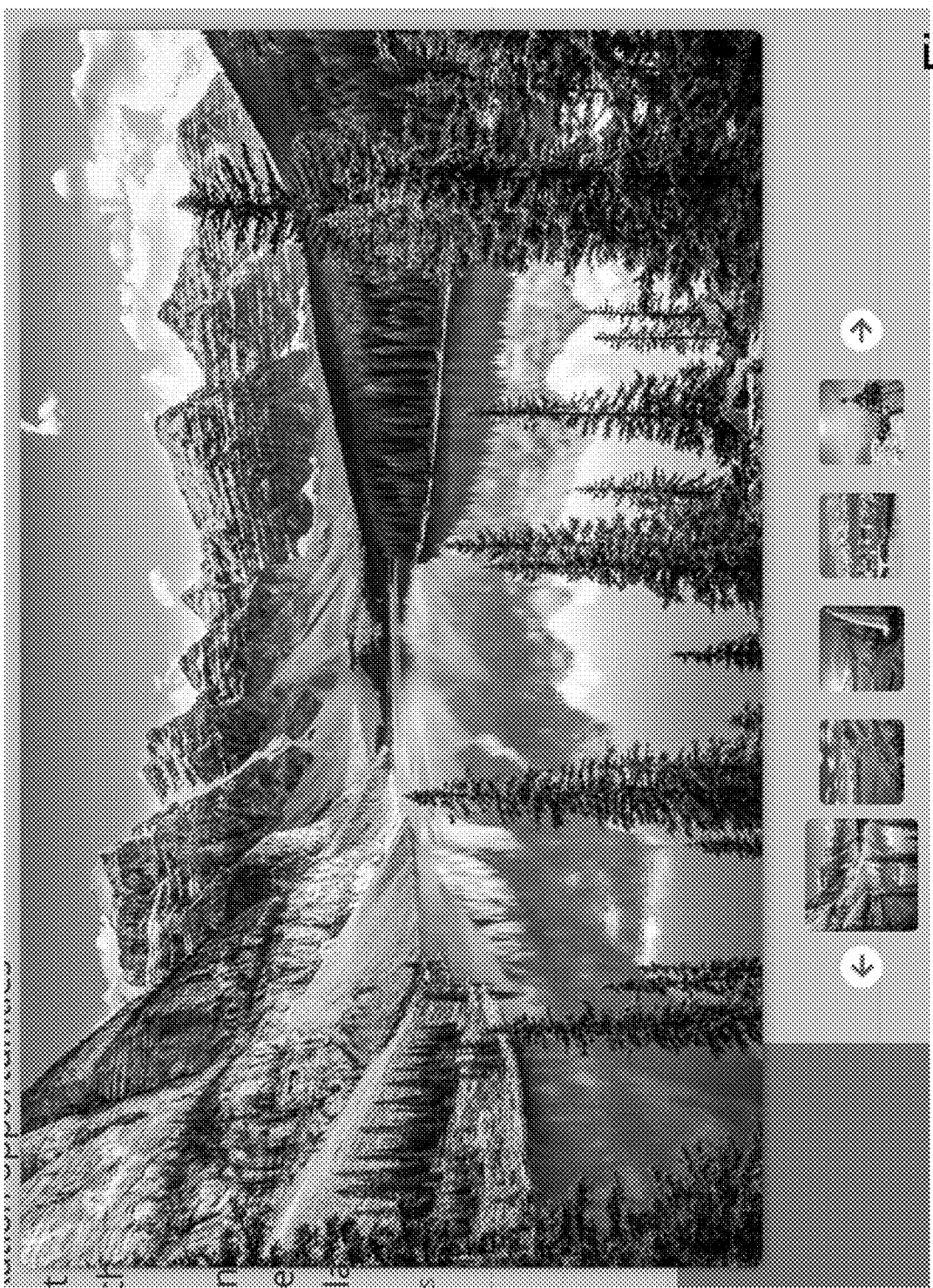

Turning now to FIG. 26, an example screenshot 2600 of multimedia thumbnails in ratios and responses. This enables a user to view task or question stimuli without the need to toggle between various pages. Again, efficiency of analysis is thereby increased.

At FIGS. 27A-H, example screenshots of a participant portal are provided. In screenshot 2700A of FIG. 27A, the participant is greeted and her name is requested for initial profile generation. In screenshot 2700B of FIG. 27B, the participant is asked where they live. In screenshot 2700C of FIG. 27C, the participant is asked for an email contact, and in screenshot 2700D of FIG. 27D, the participant is asked to select a password. This completes the account generation, and subsequently the participant is asked some additional questions to further flush out her profile.

Figure 27C:
Figure 27B:
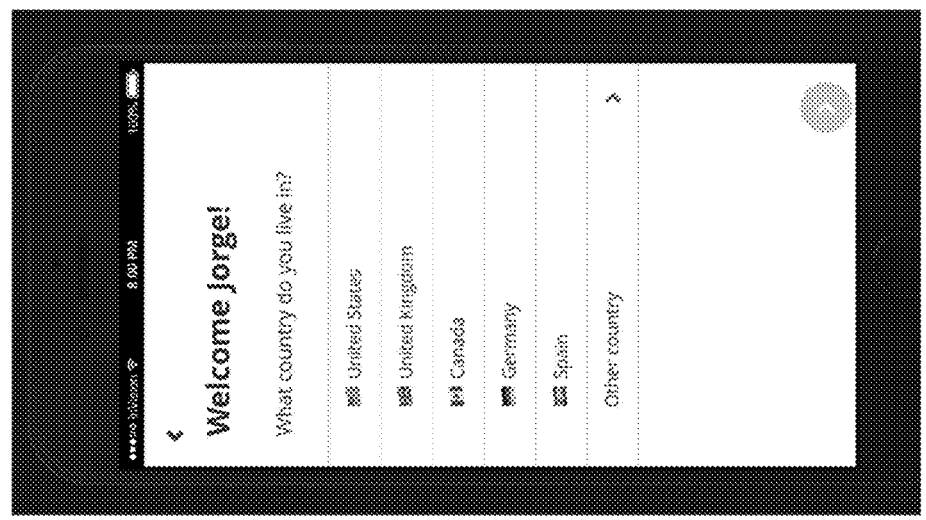
Figure 27A:
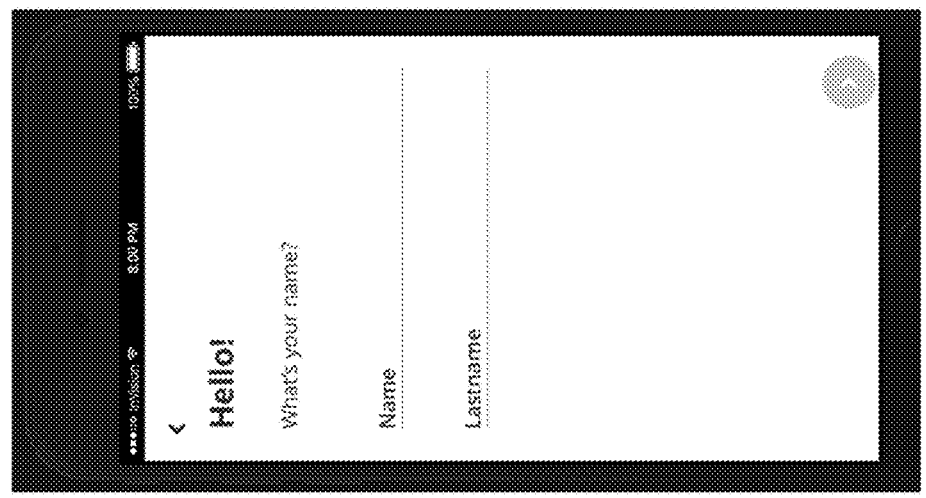
Figure 27F:
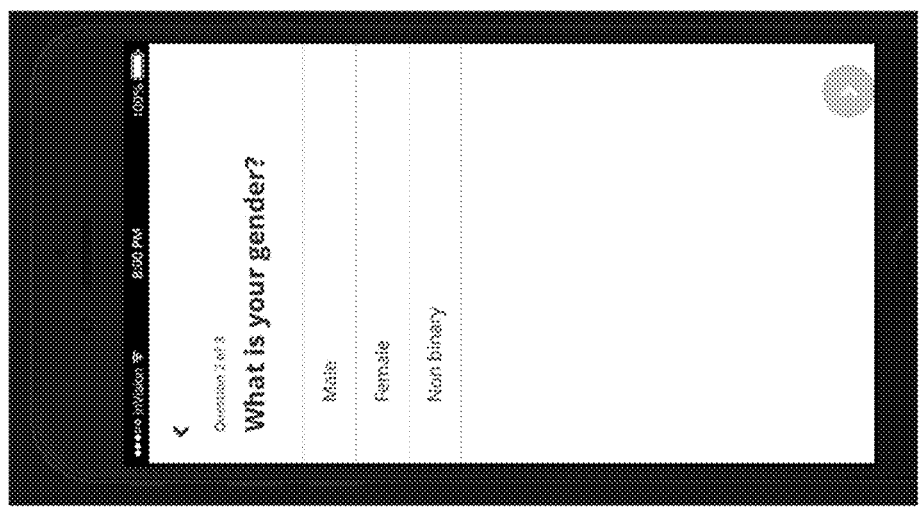
Figure 27E:
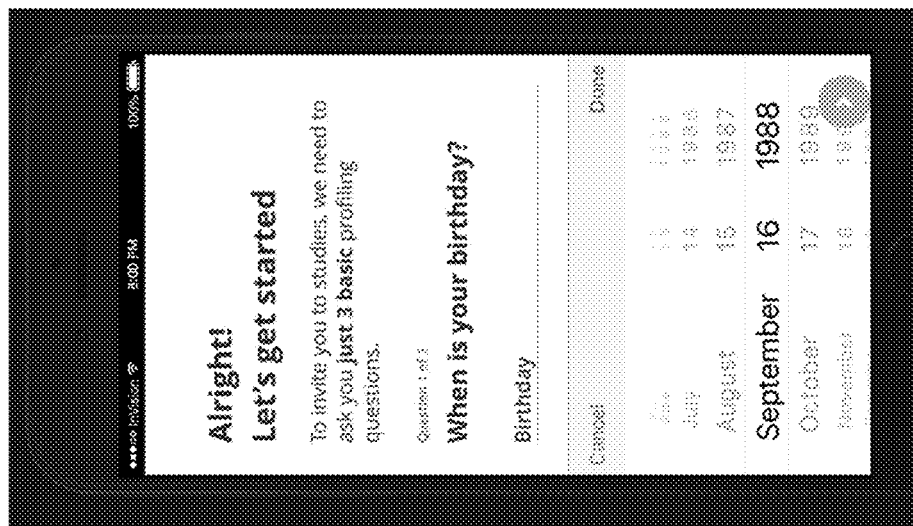
Figure 27D:
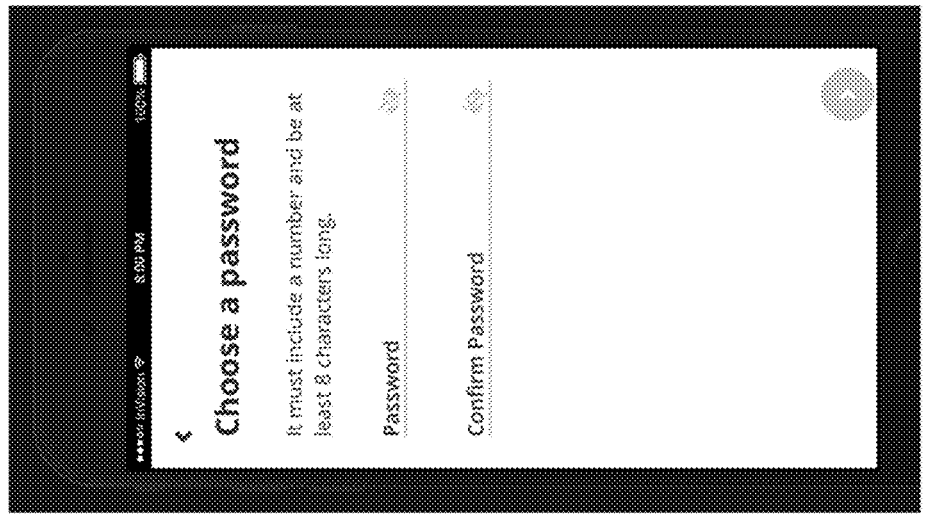

For example, in screenshot 2700E of FIG. 27E, the participant asked for her birthday to establish her age. In screenshot 2700F of FIG. 27F, the participant is queried for her gender. Lastly, at screenshot 2700G of FIG. 27G, the participant is asked about the household income level. This completes the basic profile information required to be considered for most studies. Over time additional profile information may be gathered from public sources about the participant (e.g., voting party registration, credit score, etc.). The participant may also offer additional profile details that may be collected and stored with their profile (e.g., marriage status, music preference, number of people in household, etc.). Additional profile information may be leveraged by the study authors to more quickly and efficiently hone in on users that are the target of a particular website, service or product.

Figure 27H:
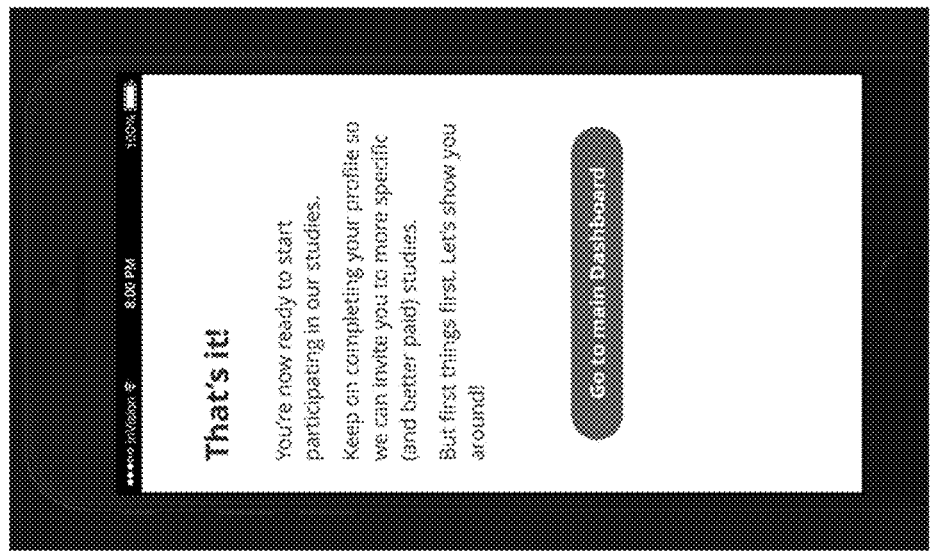
Figure 27G:
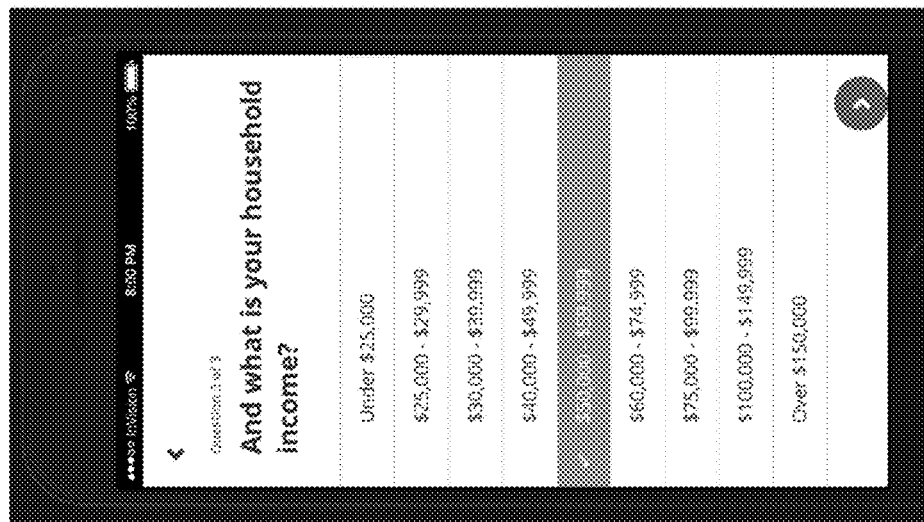

After all basic profile questions have been answered, the participant is sent to a welcome page as shown in the screenshot 2700H of FIG. 27H, which provides access to the main dashboard that allows participants to view and select from studies that they may be interested in participating with.

Now turning to FIG. 28, an example screenshot 2800 of a company's account settings is provided, as it applies to their payment structure. Various study features are provided as options that may be enabled versus disabled. The subscription fees associated with using the study generation, administration and analysis tools are impacted by which features are enabled. For example, in this screenshot, the user is able to make unlimited basic studies on mobile devices, desktop devices and applications. They are also able to generate advanced studies, but are limited in number. The participant limitations for these advanced studies are limited to five segments of thirty participants. In this example set of user settings, additional features such as surveys, live interceptions, and moderated studies are all disabled. For this particular set of study features, the user company will be provided a monthly subscription fee that is commiserate with the allowed functionality.

Some portions of the above detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for transcript analysis of a recording comprising:
   transmitting to a server a recording of an audio portion and at least one of a screen capture recording of a target web site and a camera video recording of a user engaged in a user experience recorded on an end user device, in addition to duration of usage of the target web site collected by inserting a virtual tracking code into the target web site using a processor on the end user device;
   transcribing at the server the audio portion of the recording to generate a transcription;
   synchronizing timing at the server of the transcription to the at least one screen capture recording and camera video recording;
   receiving at the server a selection of a section of the transcription on a graphical user interface by a researcher from a third party computer system responsive to the usage and automatically generating, at the server, a video clip, which is a subset of the video portion of the recording, wherein the start time of the video clip is based upon determining a length of time before the selected transcription as the shorter of a threshold time and a delay time between an end of a word directly before a first word of the selected transcription start, and the end time of the video clip is based upon the selection, and wherein the selection is synchronized to the video clip; and
   transmitting the automatically generated video clip to the third-party computer system.

2. The method of claim 1, wherein the recording is audio and video recording of a participant engaged in a user experience study.

3. The method of claim 2, further comprising processing the video recording by a neural network.

4. The method of claim 3, wherein the processing includes at least one of eye tracking and emotion detection.

5. The method of claim 1, further comprising appending an annotation to a flag added to at least one of the recording and the transcription.

6. The method of claim 5, wherein the appended annotation is searchable by the keyword.

7. The method of claim 1, further comprising aggregating a plurality of recordings.

8. The method of claim 7, further comprising filtering the plurality of recordings by success criteria, participant attribute, and keywords.

9. The method of claim 1, further comprising searching the transcription by a keyword.

10. A system for transcript analysis of a recording comprising:
    a computer server coupled to a network, including a processor and a memory, configured to perform, when the memory is executed by the processor, the functions of:
      receiving via the network a recording of an audio portion and at least one of a screen capture recording and a camera video recording of a user engaged in a user experience recorded on an end user device, in addition to duration of usage of the target web site collected by inserting a virtual tracking code into the target web site using a processor on the end user device;
      transcribing the audio portion of the recording to generate a transcription, synchronizing timing of the transcription to the at least one screen capture recording and camera video recording;
      receiving a selection of a section of the transcription on a graphical user interface by a researcher from a third party computer system responsive to the usage and automatically generating a video clip, which is a subset of the video portion of the recording, wherein the start time of the video clip is based upon determining a length of time before the selected transcription as the shorter of a threshold time and a delay time between an end of a word directly before a first word of the selected transcription start, and the end time of the video clip is based upon the selection, and wherein the selection is synchronized to the video clip; and
      transmitting the automatically generated video clip to the third-party computer system.

11. The system of claim 10, wherein the recording is audio and video recording of a participant engaged in a user experience study.

12. The system of claim 11, further comprising a neural network operating on the server for processing the video recording.

13. The system of claim 12, wherein the processing includes at least one of eye tracking and emotion detection.

14. The system of claim 10, wherein the transcription server is further configured to append an annotation to a flag added to at least one of the recording and the transcription.

15. The system of claim 14, wherein the appended annotation is searchable by the keyword.

16. The system of claim 10, further comprising a database for aggregating a plurality of recordings.

17. The system of claim 16, further comprising an analytics processor operating on the server for filtering the plurality of recordings by success criteria, participant attribute, and keywords.

18. The system of claim 10, further comprising an analytics processor operating on the server for searching the transcription by a keyword.

* * * * *